(12) United States Patent
Hayaishi

(10) Patent No.: US 8,249,312 B2
(45) Date of Patent: Aug. 21, 2012

(54) IMAGE PROCESSING DEVICE AND IMAGE PROCESSING METHOD

(75) Inventor: Ikuo Hayaishi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1008 days.

(21) Appl. No.: 12/199,668

(22) Filed: Aug. 27, 2008

(65) Prior Publication Data

US 2009/0060384 A1  Mar. 5, 2009

(30) Foreign Application Priority Data

Aug. 27, 2007 (JP) .................. 2007-219712

(51) Int. Cl.
*G06K 9/00* (2006.01)
(52) U.S. Cl. ...................................... 382/118
(58) Field of Classification Search .............. 382/118, 382/103, 224
See application file for complete search history.

(56) References Cited

U.S. PATENT DOCUMENTS 7,324,669 B2 * 1/2008 Nakanishi et al. ............ 382/118
2007/0285528 A1 * 12/2007 Mise et al. ................. 348/222.1

FOREIGN PATENT DOCUMENTS

| JP | 2004-318204 | 11/2004 |
| JP | 2005-025703 | 1/2005 |
| JP | 2006-163871 | 6/2006 |

* cited by examiner

*Primary Examiner* — Claire X Wang
(74) *Attorney, Agent, or Firm* — DLA Piper LLP (US)

(57) ABSTRACT

An image processing device includes a size setting unit and a deformation processing unit. The size setting unit sets the size of a specific subject in the width direction and in the depth direction in a target image generated through imaging. The deformation processing unit deforms an image within an area, which includes an image of the specific subject in the target image, to a deformation degree corresponding to the set size.

10 Claims, 24 Drawing Sheets

$$\begin{cases} Sd : Ww = f : Wx & \cdots(1) \\ Ww : Wf = Wwi : Wfi & \cdots(2) \end{cases}$$

⇩

$$Sd = (Wwi \times Wf \times f) / (Wfi \times Wx) \cdots(3)$$

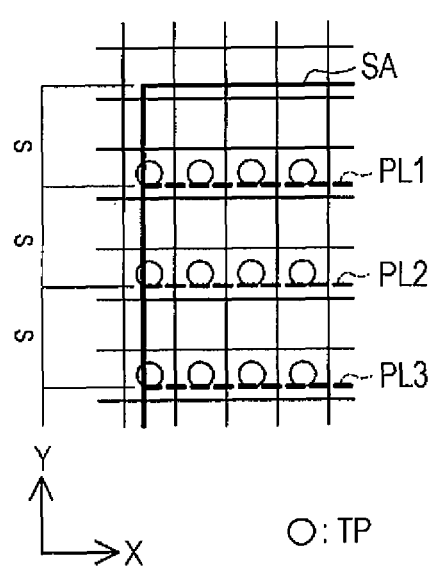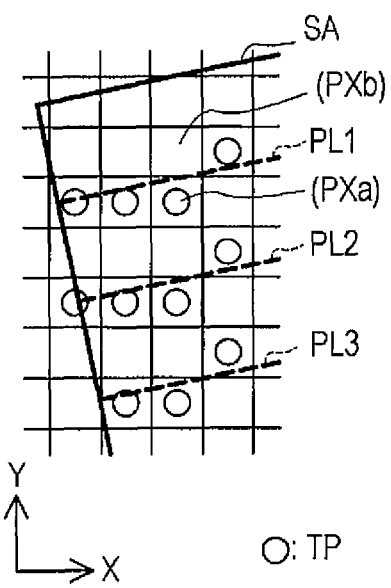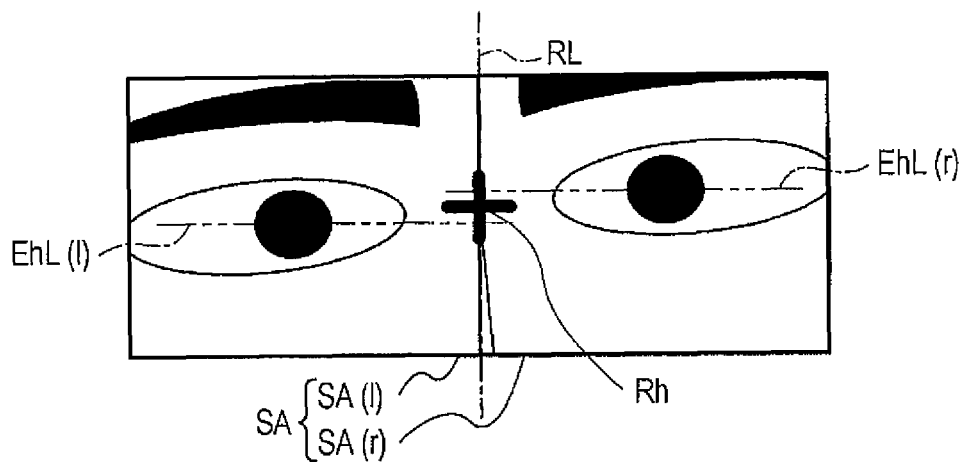

| | H | V |
|---|---|---|
| D11 | DQp | 2*DQp |
| D21 | DQp | 2*DQp |
| D31 | -DQp | 2*DQp |
| D41 | -DQp | 2*DQp |
| D12 | DQp | 0 |
| D22 | 0 | 0 |
| D32 | 0 | 0 |
| D42 | -DQp | 0 |

IMAGE PROCESSING DEVICE AND IMAGE PROCESSING METHOD

CROSS-REFERENCE TO RELATED APPLICATIONS

This application claims the benefit of priority under 35 USC 119 of Japanese application no. 2007-219712, filed on Aug. 27, 2007, which application is hereby incorporated by reference.

BACKGROUND

1. Technical Field

The present invention relates to an image processing technology for deforming at least a portion of an area on a target image.

2. Related Art

An image processing technology for deforming a digital image has been known, which is, for example, described in JP-A-2004-318204. JP-A-2004-318204 describes an image processing that deforms the shape of a face in such a manner that a portion of an area on the image of a face (an area that shows the image of a cheek) is set as a correction area, the correction area is divided into a plurality of small areas in accordance with a predetermined pattern, and the image is enlarged or reduced by a scaling factor set for each small area.

The impression obtained by observing an image of a face that is generated through imaging using an image pickup apparatus (for example, a digital still camera) possibly differs from the impression obtained by observing the actual face. In such a case, it is conceivable to perform image processing by which the shape of the image of the face is deformed to approximate the impression of the image of the face to the impression of the actual face. However, the impression of the image of a face may vary depending on various factors, and there is a possibility that a desired image cannot be obtained even when the image is deformed in the same manner.

This problem not only applies to the case in which the image of a face, which serves as a subject, is deformed, but it also commonly applies to image processing that deforms the image of other specific subjects.

SUMMARY

An advantage of some aspects of the invention is that it makes it possible to perform image deformation by which a favorable result is obtained.

The invention may be implemented as the following aspects or application examples.

FIRST APPLICATION EXAMPLE

An image processing device includes a size setting unit and a deformation processing unit. The size setting unit sets a size of a specific subject in a width direction and in a depth direction in a target image generated through imaging. The deformation processing unit deforms an image within an area, which includes an image of the specific subject in the target image, to a deformation degree corresponding to the set size.

In the above image processing device, the size of a specific subject in the width direction and in the depth direction is set, and an image within an area that includes an image of the specific subject in the target image is deformed to a deformation degree corresponding to the set size. Thus, it is possible to implement image deformation by which a difference between the impression of an image and the impression of a real object due to the size of a specific subject in the width direction and in the depth direction is reduced. Hence, the image processing device performs image deformation by which a favorable result is obtained.

SECOND APPLICATION EXAMPLE

In the image processing device according to the first application example, the deformation processing unit may perform image deformation such that an image is deformed at least in the width direction of the specific subject.

According to the above image processing device, it is possible to implement image deformation by which a difference between the impression of an image in the width direction and the impression of a real object in the width direction due to the size of a specific subject in the width direction and in the depth direction is reduced.

THIRD APPLICATION EXAMPLE

In the image processing device according to the first or second application example, when the size of the specific subject in one of the width direction and the depth direction is constant, the deformation processing unit may perform image deformation such that the deformation degree is increased as the ratio of the size in the depth direction to the size in the width direction increases.

According to the above image processing device, it is possible to implement image deformation by which a difference between the impression of an image and the impression of a real object is reduced for a specific subject that tends to give an impression such that a difference between the impression of an image and the impression of a real object is increased as the ratio of the size in the depth direction to the size in the width direction increases.

FOURTH APPLICATION EXAMPLE

The image processing device according to the third application example may further include a distance setting unit that sets a subject distance from an image pickup apparatus to the specific subject when the target image is generated, and the deformation processing unit may perform image deformation such that, when the size of the specific subject in the width direction and in the depth direction is constant, the deformation degree is increased as the set subject distance decreases.

According to the above image processing device, it is possible to implement image deformation by which a difference between the impression of an image and the impression of a real object is reduced for a specific subject that tends to give an impression such that a difference between the impression of an image and the impression of a real object is increased as the subject distance decreases.

FIFTH APPLICATION EXAMPLE

The image processing device according to any one of the first to fourth application examples may further include a subject detection unit that detects the image of the specific subject in the target image.

According to the above image processing device, it is possible to implement image deformation by which a difference between the impression of an image and the impression of a real object is reduced for a specific subject detected from a target image.

SIXTH APPLICATION EXAMPLE

In the image processing device according to any one of the first to fifth application examples, the specific subject may have a substantially elliptical horizontal cross section.

According to the above image processing device, it is possible to implement image deformation by which a difference between the impression of an image and the impression of a real object is reduced for a subject that has a substantially elliptical horizontal cross section that is likely to produce a difference between the impression of an image and the impression of a real object due to the size in the width direction and in the depth direction.

SEVENTH APPLICATION EXAMPLE

In the image processing device according to any one of the first to sixth application examples, the specific subject may be a head of a person.

According to the above image processing device, it is possible to implement image deformation by which a difference between the impression of an image and the impression of a real object is reduced for the head of a person, which is a subject, that is likely to produce a difference between the impression of an image and the impression of a real object due to the size in the width direction and in the depth direction.

The aspects of the invention may be implemented in various forms. For example, it may be implemented in a form, such as an image processing method and device, an image deformation method and device, an image generating method and device, a printing method and device, a computer program for implementing the functions of these methods or devices, a recording medium that contains the computer program, data signals that are implemented in carrier waves that contain the computer program, and the like.

BRIEF DESCRIPTION OF THE DRAWINGS

The invention will be described with reference to the accompanying drawings, wherein like numbers reference like elements.

FIG. 20A and FIG. 20B are views, each of which illustrates one example of a method of selecting evaluation target pixels.

FIG. 21 is a view that illustrates one example of a method of determining a height reference point.

DESCRIPTION OF EXEMPLARY EMBODIMENTS

An embodiment of the invention is now described in the following order on the basis of an example embodiment.
A. Example Embodiment
A-1. Configuration of Image Processing Device
A-2. Face Shape Correction Printing Process
A-3. Setting of Deformation Area
A-4. Deformation Process
A-5. Other Deformation Process
B. Alternative Example Embodiments

A. Example Embodiment

A-1. Configuration of Image Processing Device

Figure 1:
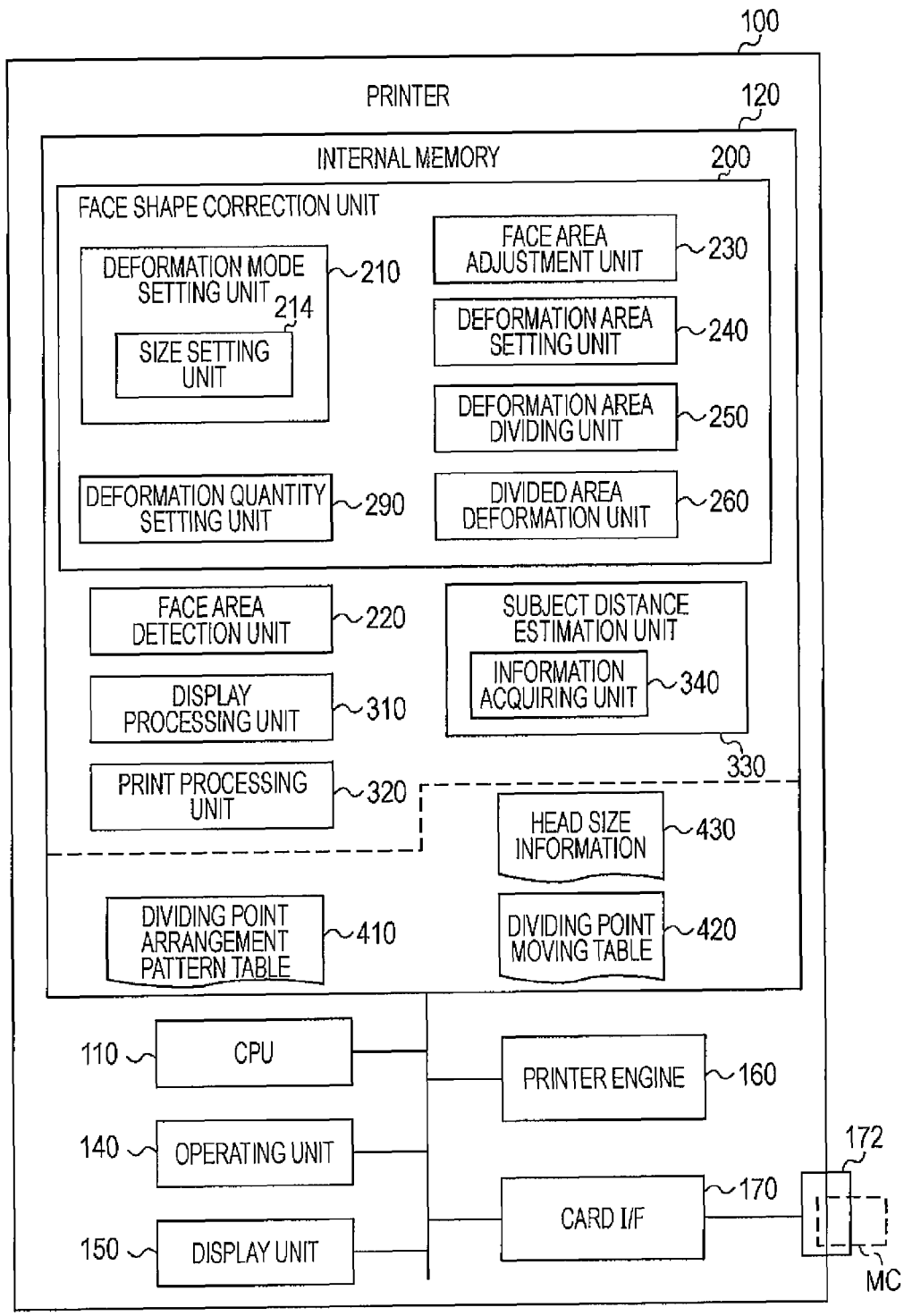
FIG. 1 is a view that schematically illustrates the configuration of a printer, which serves as an image processing device, according to an example embodiment of the invention.

FIG. 1 schematically illustrates the configuration of a printer 100, which serves as an image processing device, according to an example embodiment of the invention. The printer 100 of the present example embodiment is a color ink jet printer that prints out an image on the basis of image data acquired from a memory card MC, or the like, which is so-called direct print. The printer 100 includes a CPU 110, an internal memory 120, an operating unit 140, a display unit 150, a printer engine 160, and a card interface (card I/F) 170. The CPU 110 controls portions of the printer 100. The internal memory 120 is, for example, formed of ROM and/or RAM. The operating unit 140 is formed of buttons and/or a touch panel. The display unit 150 is formed of a liquid crystal display. The printer 100 may further include an interface that performs data communication with other devices (for example, a digital still camera or a personal computer). The components of the printer 100 are connected through a bus with one another.

The printer engine 160 is a printing mechanism that performs printing on the basis of print data. The card interface 170 is an interface that transmits or receives data to or from the memory card MC that is inserted in a card slot 172. In the present example embodiment, the memory card MC contains an image file that includes image data as RGB data. The image file may be, for example, a file that is generated by an image pickup apparatus, such as a digital still camera, in accordance with the EXIF (Exchangeable Image File Format) specification. The image file not only contains image data generated through imaging but also contains additional pieces of data, such as aperture, shutter speed, and the focal length of a lens, at the time of imaging. The printer 100 acquires the image file stored in the memory card MC through the card interface 170.

The internal memory 120 contains a face shape correction unit 200, a face area detection unit 220, a subject distance setting unit 330, a display processing unit 310, and a print processing unit 320. The face shape correction unit 200, the face area detection unit 220 and the subject distance setting unit 330 are computer programs that respectively execute a face shape correction process, a face area detection process and a subject distance setting process, which will be described later, under a predetermined operating system. The display processing unit 310 is a display driver that controls the display unit 150 to display a processing menu or a message on the display unit 150. The print processing unit 320 is a computer program that generates print data using image data, controls the printer engine 160 and then executes printing of an image on the basis of the print data. The CPU 110 reads out these programs from the internal memory 120 and then executes the programs to thereby implement the functions of these units.

The face shape correction unit 200 includes, as a program module, a deformation mode setting unit 210, a face area adjustment unit 230, a deformation area setting unit 240, a deformation area dividing unit 250, a divided area deformation unit 260 and a deformation quantity setting unit 290. The deformation mode setting unit 210 includes a size setting unit 214. In addition, the subject distance setting unit 330 includes an information acquiring unit 340 as a program module. The functions of these units will be specifically described in the description of the face shape correction printing process, which will be described later. As will be described later, the deformation area dividing unit 250 and the divided area deformation unit 260 perform deformation of an image. In addition, a deformation degree (deformation quantity) in deforming an image is set by the deformation quantity setting unit 290. Therefore, the deformation quantity setting unit 290, the deformation area dividing unit 250 and the divided area deformation unit 260 may be collectively termed as "deformation processing unit". In addition, the face area detection unit 220 detects the image of a face as a subject and, therefore, may be termed as "subject detection unit".

The internal memory 120 also contains a dividing point arrangement pattern table 410, a dividing point moving table 420 and head size information 430, the contents of which will be described in detail in the description of the face shape correction printing process.

A-2. Face Shape Correction Printing Process

Figure 2:
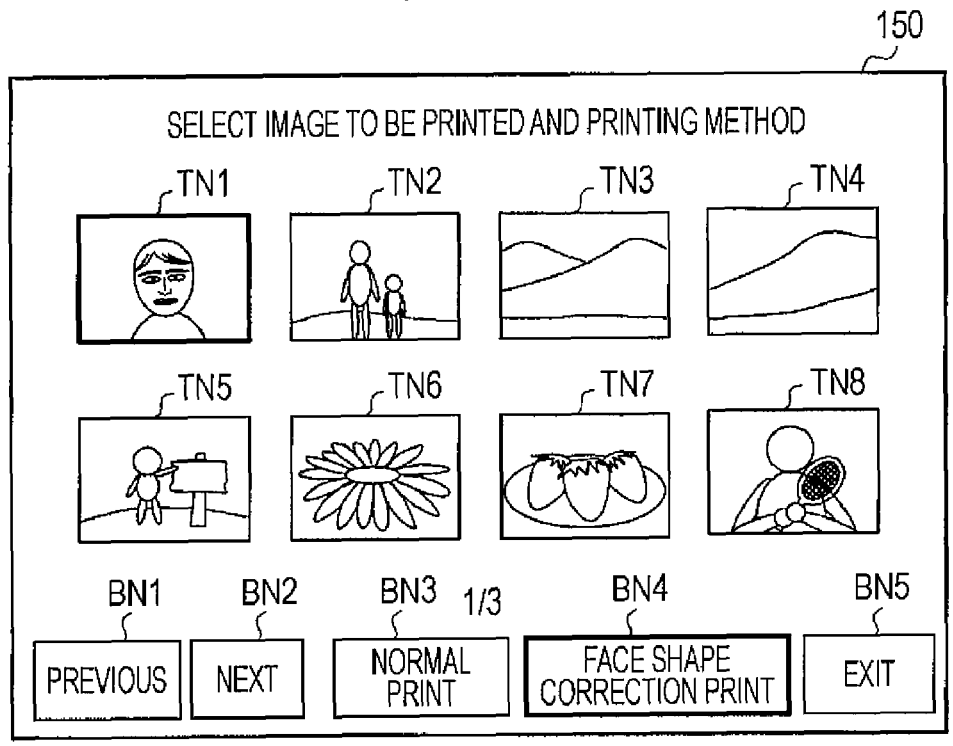
FIG. 2 is a view that illustrates one example of a user interface that includes a list display of images.

The printer 100 prints out an image on the basis of an image file stored in the memory card MC. As the memory card MC is inserted into the card slot 172, a user interface that includes a list display of images stored in the memory card MC is displayed on the display unit 150 by the display processing unit 310. FIG. 2 illustrates one example of a user interface that includes the list display of images. On the user interface shown in FIG. 2, eight thumbnail images TN1 to TN8 and five buttons BN1 to BN5 are displayed. In the present example embodiment, the list display of images is performed using thumbnail images included in the image file that is contained in the memory card MC.

When a user selects an image (or multiple images) and in addition selects a normal print button BN3 using the user interface shown in FIG. 2, a normal printing process is executed in which the printer 100 prints out the selected image as usual. On the other hand, when a user selects an image (or multiple images) and in addition selects a face shape correction print button BN4 using the user interface, the printer 100 executes a face shape correction printing process on the selected image, in which the printer 100 corrects the shape of the image of a face in the selected image and then prints out the corrected image. In the example shown in FIG. 2, the thumbnail image TN1 and the face shape correction print button BN4 are selected. Thus, the printer 100 performs a face shape correction printing process on an image corresponding to the thumbnail image TN1.

Figure 3:
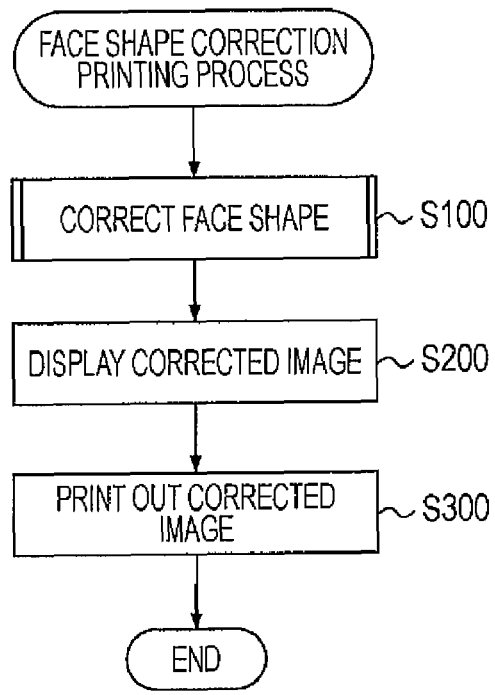
FIG. 3 is a flowchart of a face shape correction printing process that is performed by the printer according to the present example embodiment.

FIG. 3 is a flowchart of a face shape correction printing process performed by the printer 100 according to the present example embodiment. In step S100, the face shape correction unit 200 (FIG. 1) executes a face shape correction process. In the face shape correction process at least part of the shape of a face (for example, the shape of the contour of a face and the shape of eyes) in the image is corrected. Note that parts of the face, such as eyes or a nose, are generally called organs as well.

Figure 4:
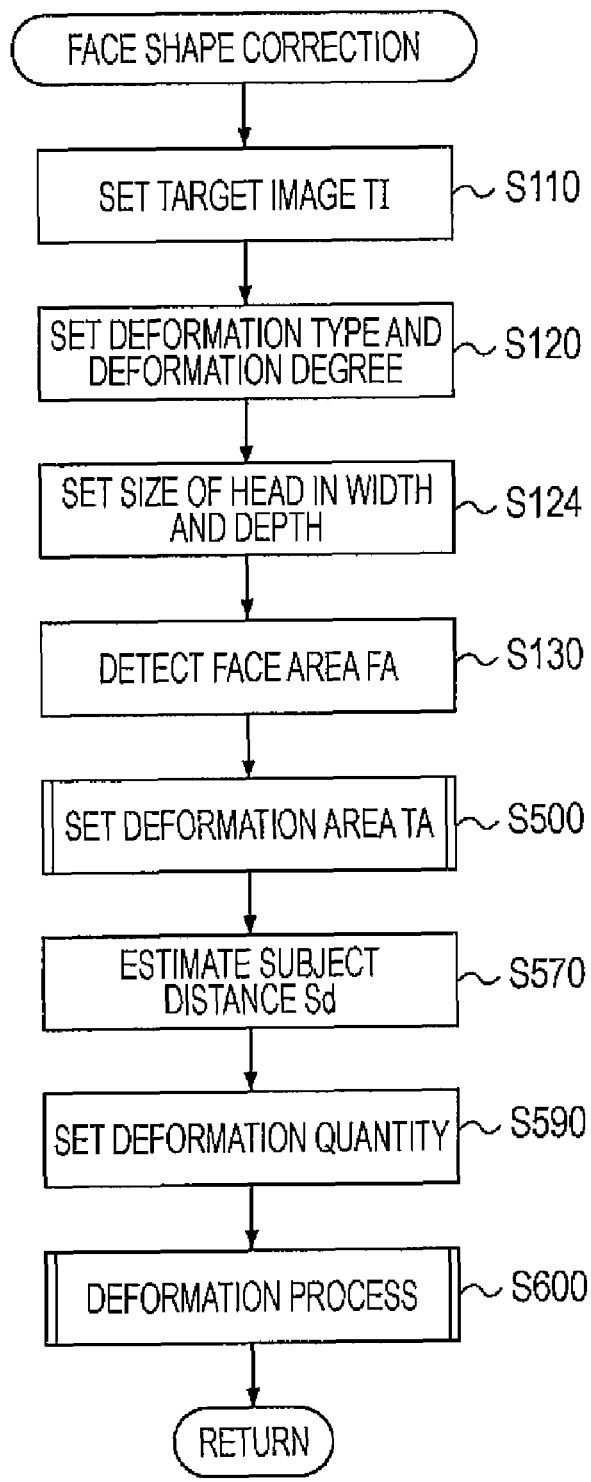
FIG. 4 is a flowchart of a face shape correction process according to the present example embodiment.

FIG. 4 is a flowchart of the face shape correction process (step S100 in FIG. 3) according to the present example embodiment. In step S110, the face shape correction unit 200 (FIG. 1) sets a target image TI on which the face shape correction process will be executed. The face shape correction unit 200 sets the image corresponding to the thumbnail image TN1, which is selected by a user through the user interface shown in FIG. 2, as the target image TI. The image file of the set target image TI is acquired by the printer 100 from the memory card MC through the card interface 170 and is stored in a predetermined area of the internal memory 120. The image data that is contained in the image file, which is acquired from the memory card MC and stored in the internal memory 120 of the printer 100 as described above, is also termed herein as "original image data". In addition, the image represented by the original image data is also termed "original image".

In step S120 (FIG. 4), the deformation mode setting unit 210 (FIG. 1) sets the type of image deformation and the degree of image deformation for face shape correction. The deformation mode setting unit 210 instructs the display processing unit 310 to display a user interface, with which the type and degree of image deformation are set, on the display unit 150, selects the type and degree of image deformation that are specified by the user through the user interface, and then sets the type and degree of image deformation used for processing.

Figure 5:
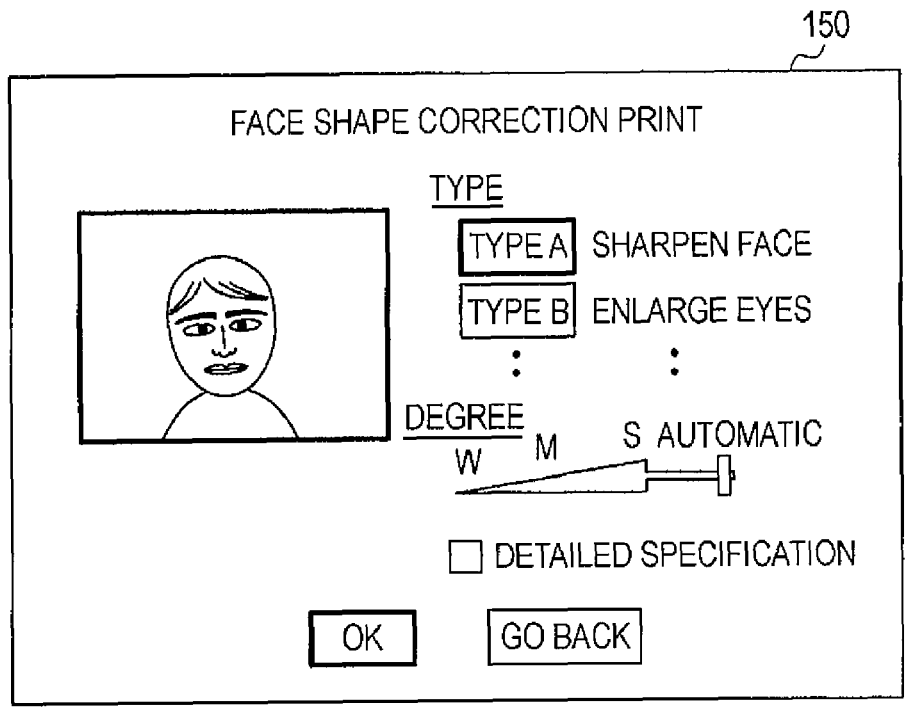
FIG. 5 is a view that illustrates one example of a user interface for setting the type and degree of image deformation.

FIG. 5 illustrates one example of a user interface for setting the type and degree of image deformation. As shown in FIG. 5, this user interface includes an interface for setting the type of image deformation. In the present example embodiment, for example, a deformation type "type A" in which the shape of a face is sharpened, a deformation type "type B" in which the shape of eyes is enlarged, and the like, are set in advance as choices. The user specifies the type of image deformation using this interface. The deformation mode setting unit 210 sets the image deformation type, which is specified by the user, as an image deformation type used for actual processing.

In addition, the user interface shown in FIG. 5 includes an interface for setting the degree (extent) of image deformation. As shown in FIG. 5, in the present example embodiment, the degree of image deformation is set in advance as four choices consisting of three steps Strong (S), Middle (M) and Weak (W), and Automatic. The user specifies the degree of image deformation using this interface. When any one of the three choices, Strong, Middle, and Weak is specified, the deformation mode setting unit 210 sets the specified degree of image deformation as the degree of image deformation used for actual processing. When "Automatic" is specified, the degree of image deformation (deformation quantity) is automatically set by the deformation quantity setting unit 290 (FIG. 1). The checkbox provided on the user interface is checked when the user desires to specify the deformation mode in detail.

In the following description, it is assumed that the deformation type "type A" in which the shape of a face is sharpened is set as the type of image deformation, the degree "Automatic" is set as the degree of image deformation (deformation quantity), and a detailed specification is not desired by the user.

In step S124 (FIG. 4), the size setting unit 214 (FIG. 1) sets the size of the head of a person, which serves as a subject, in the width direction and in the depth direction in the target image TI. Setting of the size of the head by the size setting unit 214 is executed in order to automatically set the degree of image deformation (deformation quantity) (step S590 in FIG. 4), which will be described later. The size setting unit 214 instructs the display processing unit 310 to display a user interface, with which the size of the head is set, on the display unit 150, and sets the size of the head on the basis of the instruction from the user through the user interface.

Figure 6:
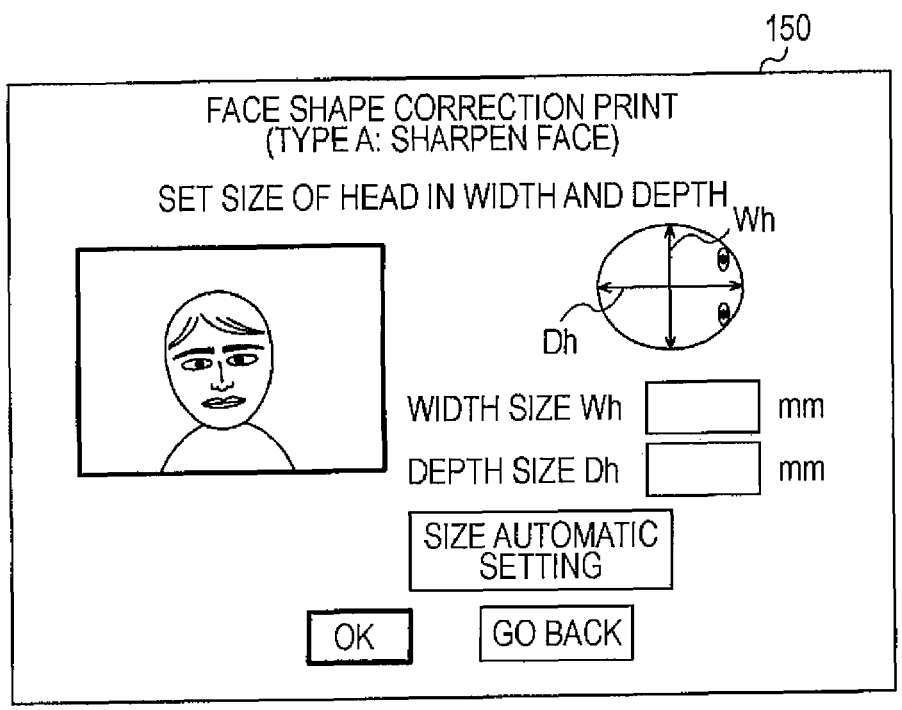
FIG. 6 is a view that illustrates one example of a user interface for setting the size of a head.

FIG. 6 illustrates one example of a user interface for setting the size of the head. As shown in FIG. 6, this user interface includes entry fields for the size Wh of the head in the width direction and the size Dh of the head in the depth direction. When the user enters a value of the size Wh in the width direction and a value of the size Dh in the depth direction into the entry fields and then selects the "OK" button, the size setting unit 214 sets the entered values as the size Wh in the width direction and the size Dh in the depth direction of the head. The user interface shown in FIG. 6 also includes a "size automatic setting" button. When the user selects the "size automatic setting" button and then selects the "OK" button, the size setting unit 214 automatically sets the size Wh in the width direction and the size Dh in the depth direction of the head. The head size information 430 (FIG. 1) stored in the internal memory 120 defines standard values of the size Wh in the width direction and the size Dh in the depth direction of the head of a person. The automatic setting of the size of the head by the size setting unit 214 is performed by setting the standard values defined in the head size information 430 as the values of the size Wh in the width direction and the size Dh in the depth direction of the head.

In step S130 (FIG. 4), the face area detection unit 220 (FIG. 1) detects a face area FA in the target image TI. Here, the face area FA means an image area on the target image TI and an area that includes at least part of image of a face. The detection of the face area FA by the face area detection unit 220 is executed by means of a known face detection method, such as a method through pattern matching using, for example, templates (refer to JP-A-2004-318204).

Figure 7:
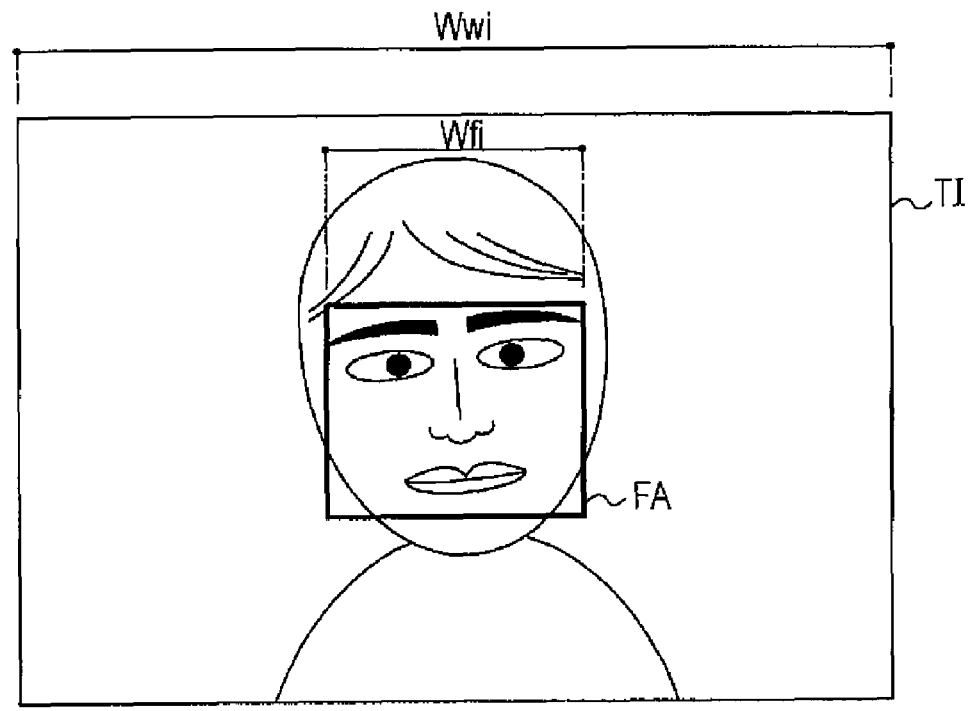
FIG. 7 is a view that illustrates one example of a detected face area.

FIG. 7 illustrates one example of a detected face area FA. In FIG. 7, the face image of a person is included in a target image TI. Therefore, in step S130, a face area FA is detected from the target image TI. As shown in FIG. 7, the face area FA is a rectangular area that includes the images of eyes, a nose and a mouth on the target image TI. The face area detection unit 220, as a result of detection of the face area FA, outputs information (for example, the coordinates of four vertexes of the face area FA) that can specify the position of the face area FA in the target image TI. In addition, as shown in FIG. 7, in the present example embodiment, the width of the target image TI is represented by Wwi (unit: the number of pixels) and the width of the face area FA is represented by Wfi (unit: the number of pixels).

In step S130, when no face area FA is detected, the user is notified to that effect through the display unit 150. In this case, normal printing that does not accompany face shape correction may be performed or a detection process to detect a face area FA may be performed again using another face detection method.

In step S130, a face area FA is detected from the target image TI through a known face detection method, such as a method through pattern matching using templates. The known face detection method generally does not minutely detect the position or inclination (angle) of the entire face or portions of a face (eyes, a mouth, or the like) but sets an area in the target image TI, in which it may be regarded that the image of a face is substantially included, as the face area FA.

Figure 8:
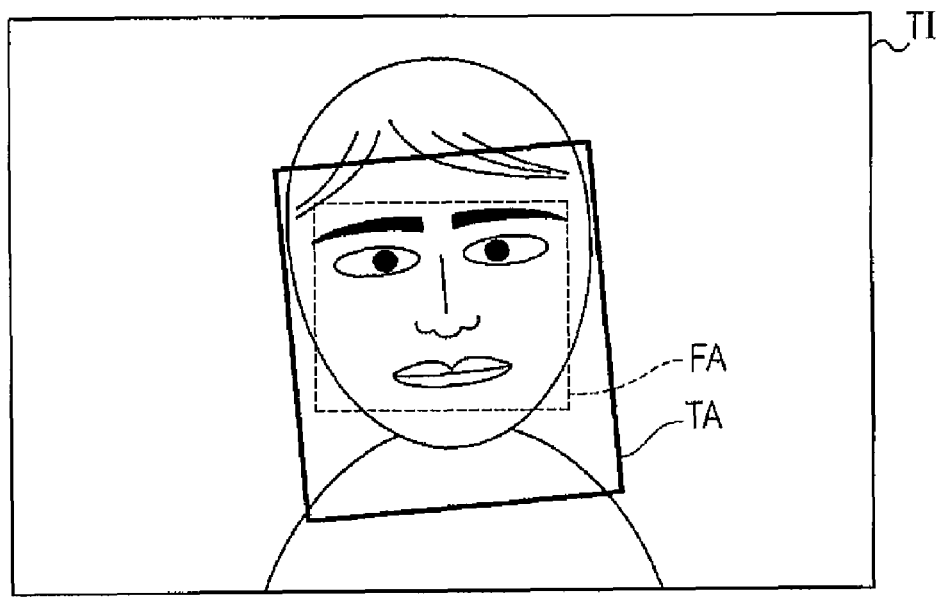
FIG. 8 is a view that illustrates a set deformation area in step S500.

In step S500 (FIG. 4), the printer 100 sets a deformation area TA on the basis of the detected face area FA. The deformation area TA is an area on the target image TI and is an area on which image deformation process is performed for face shape correction. The method of setting a deformation area will be described later in detail in the description of "A-3. Setting of Deformation Area". FIG. 8 illustrates the result of setting of the deformation area TA in step S500. The broken line in FIG. 8 indicates the face area FA that is detected in step S130. The wide line in FIG. 8 indicates the set deformation area TA.

In step S570 (FIG. 4), the subject distance setting unit 330 (FIG. 1) sets the subject distance Sd. The subject distance Sd means a distance from the image pickup apparatus (more specifically, the principal point of the lens of the image pickup apparatus) to a specific subject at the time of imaging of the target image TI. In addition, in the present example embodiment, the head of a person is set as the specific subject. Thus, the subject distance Sd in the present example embodiment is a distance from the image pickup apparatus to the head of a person. Setting of the subject distance Sd by the subject distance setting unit 330 is executed for automatically setting the degree of image deformation (deformation quantity) (step S590 in FIG. 4), which will be described later.

Figure 9:
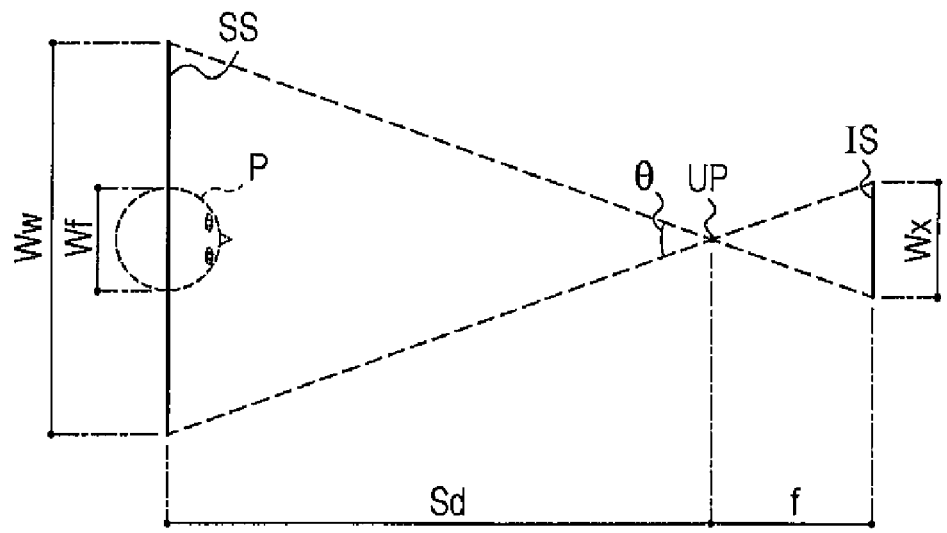
FIG. 9 is a view that illustrates a method of estimating a subject distance.

The subject distance setting unit 330 estimates a subject distance Sd and sets the estimated value as the subject distance Sd. FIG. 9 illustrates a method of estimating the subject distance Sd. FIG. 9 shows the positional relationship between an imaging plane IS of the image pickup apparatus and the head of a person P, which serves as a subject, at the time of imaging of the target image TI. As shown in FIG. 9, the subject distance Sd, which is a distance between the principal point UP of the lens and (the center of) the head of the person P, is determined on the basis of both the width Ww and the angle of view θ of an image pickup range on a plane (hereinafter, also referred to as "subject plane SS") parallel to the imaging plane IS that includes the position of the head of the person P. In addition, the angle of view θ is determined on the basis of the relationship between the focal length f of the lens and the width Wx of the imaging plane IS. That is, the following Equation (1) holds true.

Equation 1

$$Sd:Ww=f:Wx \quad (1)$$

In addition, the width Ww of the image pickup range on the subject plane SS is determined on the basis of an area that is occupied by the image of a subject, of which the size is known, in the target image TI. In the present example embodiment, because the size of the image of the face in the target image TI is known (see FIG. 7), the face of a person is used as a subject of which the size is known. That is, it may be regarded that the ratio of the width Ww of the image pickup range to the width Wf of the face of the person P on the subject plane SS is equal to the ratio of the width Wwi of the entire image to the width Wfi of the face area FA in the target image TI shown in FIG. 7 (see Equation (2)).

Equation 2

$$Ww:Wf=Wwi:Wfi \quad (2)$$

From the above Equation (1) and Equation (2), the following Equation (3) is derived.

Equation 3

$$Sd = \frac{Wwi \cdot Wf \cdot f}{Wfi \cdot Wx} \quad (3)$$

The information acquiring unit 340 (FIG. 1) of the subject distance setting unit 330 acquires information that is necessary to calculate the subject distance Sd using Equation (3). Specifically, the information acquiring unit 340 acquires the value (number of pixels) of the overall width Wwi of the target image TI that is added, as metadata, to the image file that represents the target image TI, and calculates the value (number of pixels) of the width Wfi of the face area FA (FIG. 7). The width Wfi of the face area FA is, for example, calculated by calculating a distance between two vertexes of the face area FA using the coordinates of the two vertexes.

The information acquiring unit 340 also acquires, as a value of the width Wf of the face of the person P, a standard value (for example, 180 mm) of the width (the actual size of the face) of the face of a person that is set in advance and stored in the internal memory 120 (FIG. 1). The information acquiring unit 340 may acquire a value of the width Wf of the face of a person P entered by the user.

Furthermore, the information acquiring unit 340 acquires the value of the focal length f of the lens at the time of imaging, which is contained in additive data of the image file of the target image TI. Here, the acquired value of the focal length f of the lens is a 35 mm film equivalent, and may differ from the actual focal length of the image pickup apparatus. In this case, the information acquiring unit 340 acquires the preset value (=36 mm) of width of a 35 mm film as the width Wx of the imaging plane IS. When the additive data of the image file contains the data indicating the actual focal length and the data indicating the width of the image pickup device of the image pickup apparatus, the information acquiring unit 340 may acquire the value of the actual focal length as the focal length f of the lens and may acquire the value of the width of the image pickup device as the width Wx of the imaging plane IS. In addition, when the additive data of the image file contains the data that directly indicates an angle of view, the information acquiring unit 340 may acquire the data that indicates the angle of view. The value of the focal length f of the lens and the value of the width Wx of the imaging plane IS are pieces of information, that can determine the angle of view θ of the target image TI.

The subject distance setting unit 330 uses various pieces of information (the value of the overall width Wwi of the target image Ti, the value of the width Wfi of the face area FA, the value of the width Wf of the face of the person P, the value of the focal length f of the lens, and the value of the width Wx of the imaging plane IS), acquired by the information acquiring unit 340, and the above Equation (3) to calculate (estimate) the subject distance Sd.

Next, in step S590 (FIG. 4), the deformation quantity setting unit 290 (FIG. 1) sets a deformation quantity (also referred to as "deformation degree" or "deformation extent"). In step S600 (FIG. 4), the deformation process is executed on the image of the deformation area TA that has been set in step S500 using the deformation quantity set in step S590. The specific method of the deformation process is described in detail later in "A-4. Deformation Process".

Figure 10A:
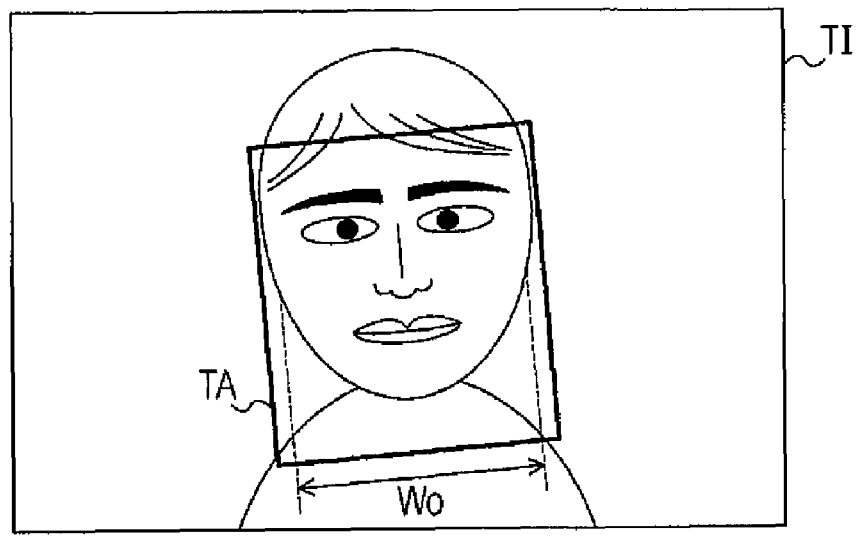
FIG. 10A and FIG. 10B are views, each of which illustrates a result for which deformation process has been performed on an image of the deformation area.
Figure 10B:
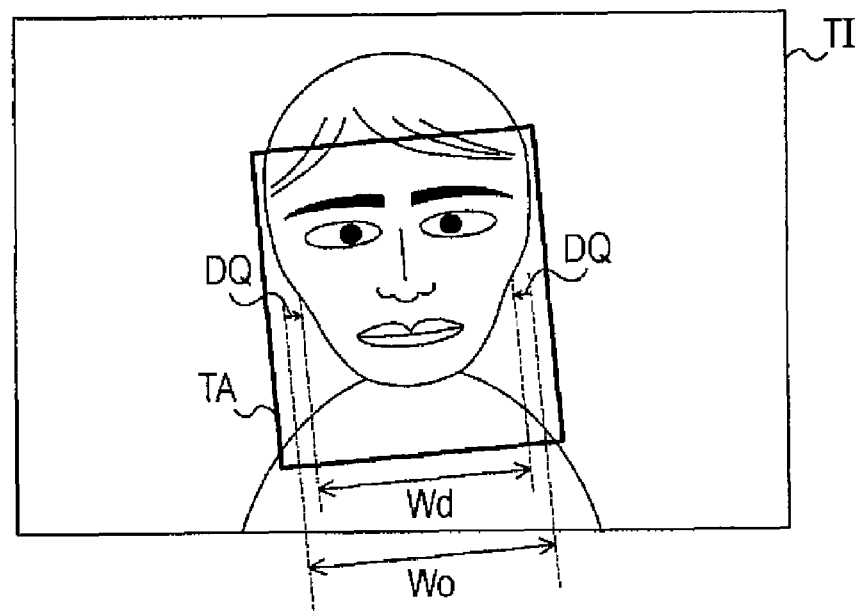

Setting of a deformation quantity by the deformation quantity setting unit 290 (step S590 in FIG. 4) is now described. FIG. 10A and FIG. 10B illustrate the result for which deformation process (step S600 in FIG. 4) has been performed on an image of the deformation area TA. FIG. 10A shows the target image TI on which the deformation process is not performed. FIG. 10B shows the target image TI on which the deformation process has been performed. In the target image TI, shown in FIG. 10B, on which the deformation process has been performed, the width of the image of the face of the person in the deformation area TA is reduced. Note that the deformation process in step S600 is performed only on the image within the deformation area TA in the target image TI and is not performed on the image outside the deformation area TA. As a result, it is possible to deform the subject without excessively deforming the entire image.

In the example shown in FIG. 10A and FIG. 10B, the image of the face is reduced and deformed in the width direction of the face, and the lines of the right and left cheeks of the face (contour of the face) are moved inwardly by the deformation quantity DQ. This deformation quantity DQ is set in step S590 of FIG. 4. Through the above deformation, the width Wd of the deformed face image is reduced twice the deformation quantity DQ in comparison with the width Wo of the face image that has not yet deformed. The reason that the image is deformed so that the width is reduced in this way is to approximate the impression obtained by observing the image of the face to the impression obtained by observing the actual face.

Figure 11:
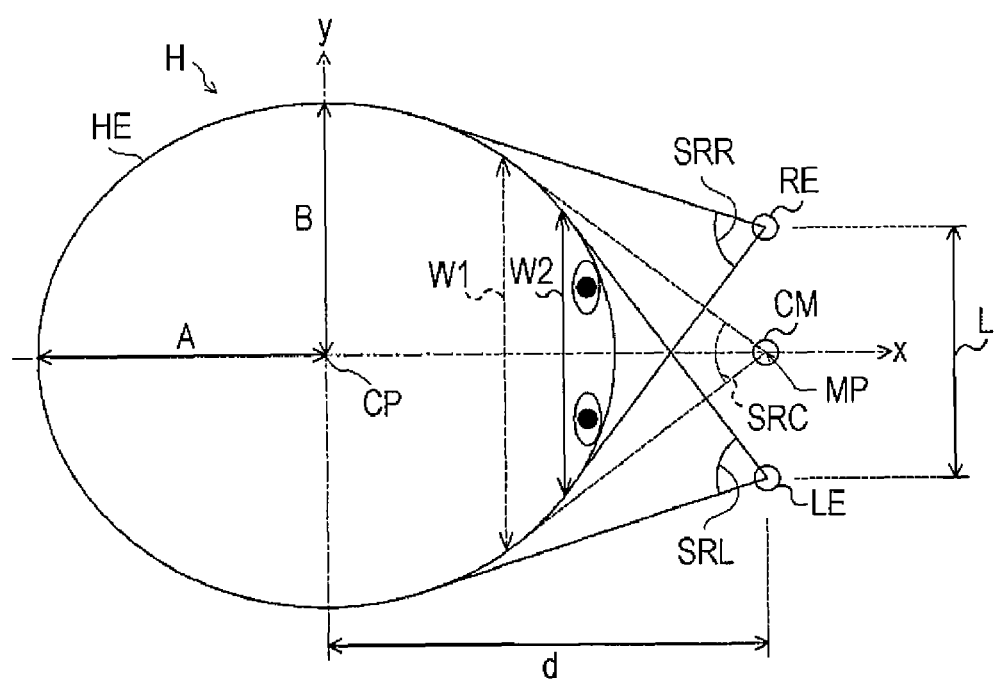
FIG. 11 is a view that illustrates a difference in impression between the image of a face and an actual face.

FIG. 11 illustrates a difference in impression between the image of a face and an actual face. In FIG. 11, a horizontal cross section of the head H of a person, the right eye RE and left eye LE of an observer and a camera CM, which serves as an image pickup apparatus, are shown. In FIG. 11, the head H is oriented so that the face portion is positioned just in front of the two eyes RE and LE. In addition, the camera CM is arranged at the middle point MP of two eyes RE and LE. That is, the camera CM is arranged so as to view the face portion of the head H from substantially the same position as the observer.

In the present example embodiment, the horizontal cross section of the head H is elliptical. In regard to the outer circumference of the horizontal cross section of the head H (hereinafter, referred to as "head ellipse HE"), the radius of the head H in the depth direction (x direction in FIG. 11) is set as A, and the radius of the head in the width direction (y direction in FIG. 11) is set as B. That is, the radius A corresponds to half the size Dh (see FIG. 6) of the head H in the depth direction, and the radius B corresponds to half the size Wh of the head H in the width direction. Note that, in this specification, the word "ellipse" includes circle (that is, the case A=B).

The middle point MP is positioned on an x-axis that passes through the center point CP of the head ellipse HE, the two eyes RE and LE are aligned along a y-axis, which is a coordinate axis that passes through the center point CP and is perpendicular to the x-axis. The distance L indicates a distance between the two eyes RE and LE. The distance d indicates a distance between the center point CP of the head ellipse HE and the eyes RE and LE along the x-axis.

The first width W1 in FIG. 11 indicates the width of portion of the head H that is viewable from the camera CM. The portion that is viewable from the camera CM is a portion in a camera subject range SRC on the surface of the head H. This camera subject range SRC indicates a range in which the head H occupies within the entire range of visual field of the camera CM. The first width W1 corresponds to a distance between two contact points of the head ellipse HE and tangent lines extending from the center point MP, and is calculated using the following Equation (4).

Equation 4

$$W1 = 2\sqrt{B^2 - \frac{A^2 B^2}{d^2}} \quad (4)$$

The second width W2 in FIG. 11 indicates the width of a portion of the head H that is viewable from both eyes RE and LE. The portion viewable from both eyes RE and LE is a portion of the range in which the right subject range SRR and the left subject range SRL overlap each other on the surface of the head H. The right subject range SRR indicates a range in which the head H occupies within the entire range of visual field of the right eye RE, and the left subject range SRL indicates a range in which the head H occupies within the entire range of visual field of the left eye LE. The second width W2 corresponds to a distance between a contact point that is closer to the middle point MP from between two contact points of the head ellipse HE and tangent lines extending from the right eye RE and a contact point that is closer to the middle point MP from between two contact points of the head ellipse HE and tangent lines extending from the left eye LE, and is calculated using the following Equation (5).

Equation 5

$$W2 = \frac{-4A^2 B^2 L + 4B^2 d \sqrt{A^2 L^2 - 4A^2 B^2 + 4B^2 d^2}}{A^2 L^2 + 4B^2 d^2} \quad (5)$$

As shown in FIG. 11, a viewable portion of the head H differs between the right eye RE and the left eye LE. That is, a portion viewable from the right eye RE is deviated to the right eye RE side, and a portion viewable from the left eye LE is deviated to the left eye LE side. In such a case, it may be presumed that recognition of the head H by a person (observer) is strongly influenced from a visible portion that is common to both eyes RE and LE. For example, it is estimated that a person may recognize the width W2 of a visible portion that is common to both eyes RE and LE as the width of the head H.

As shown in FIG. 11, the second width W2 is narrower than the first width W1. That is, when the image of a face generated through imaging is observed, a person may receive an impression that the width is wide in comparison with the width when the actual face is directly observed. Then, by deforming the image so as to narrow the width of a face as shown in FIG. 10B, it is possible to approximate the impression obtained by observing the image of the face to the impression obtained by observing the actual face.

As is apparent from the above Equations (4) and (5), the first width W1 and the second width W2 vary in accordance with values of the radii A and B and a value of the distance d. The value of the distance L may be, for example, 100 mm. The following Table 1 shows values of the ratio Ri of the second width W2 to the first width W1 (=W2/W1) when values of the radii A and B and a value of the distance d are variously changed. Because a value of the second width W2 is smaller than a value of the first width W1, a value of the ratio Ri is smaller than 1.0. In Table 1, f (=(A−B)/A) is a flattening of elliptical circumference of the horizontal cross section of the head H.

TABLE 1

|  | L(mm) | d(mm) | A(mm) | B(mm) | f | R1(= W2/W1) |
|---|---|---|---|---|---|---|
| case1 | 100 | 2,000 | 250 | 100 | 0.60 | 0.99024 |
| case2 | 100 | 2,000 | 200 | 100 | 0.50 | 0.99375 |
| case3 | 100 | 2,000 | 150 | 100 | 0.33 | 0.99649 |
| case4 | 100 | 2,000 | 100 | 100 | 0.00 | 0.99844 |
| case5 | 100 | 2,000 | 200 | 150 | 0.25 | 0.99610 |
| case6 | 100 | 2,000 | 200 | 200 | 0.00 | 0.99718 |
| case7 | 100 | 5,000 | 200 | 100 | 0.50 | 0.99980 |
| case8 | 100 | 10,000 | 200 | 100 | 0.50 | 0.99995 |

As is understood from Cases 1 to 4 in Table 1, when values of L, d, and B are constant, a value of the ratio Ri is smaller the larger a value of the radius A is. That is, a difference becomes large between the impression obtained by observing the image of a face and the impression obtained by observing the actual face. On the other hand, as is understood from Cases 2 and 5 to 7, when values of L, d, and A are constant, a value of the ratio Ri is smaller the smaller a value of the radius B is. That is, a difference becomes large between the impression obtained by observing the image of a face and the impression obtained by observing the actual face. Furthermore, as is understood from Cases 2, 7, and 8 in Table 1, when values of L, A and B are constant, a value of the ratio Ri is smaller the smaller a value of the distance d from the camera CM or an observer to the head H is. That is, a difference becomes large between the impression obtained by observing the image of a face and the impression obtained by observing the actual face.

Figure 12A:
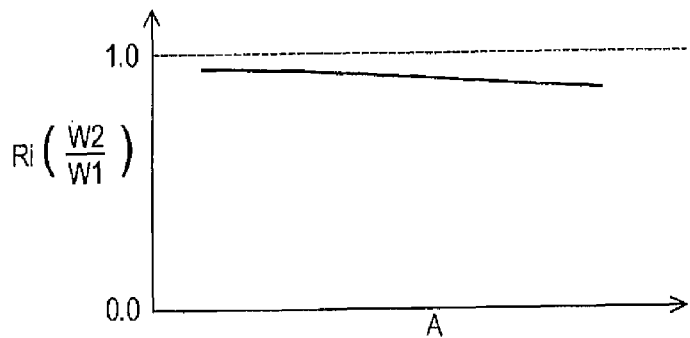
FIG. 12A to FIG. 12C are graphs that show the relationship between a radius A, a radius B, or a distance d and a ratio Ri.
Figure 12B:
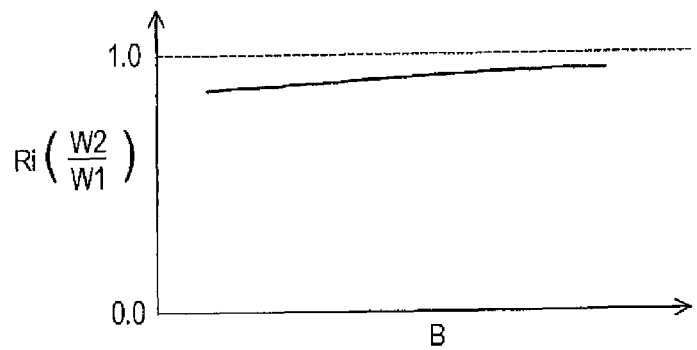
Figure 12C:
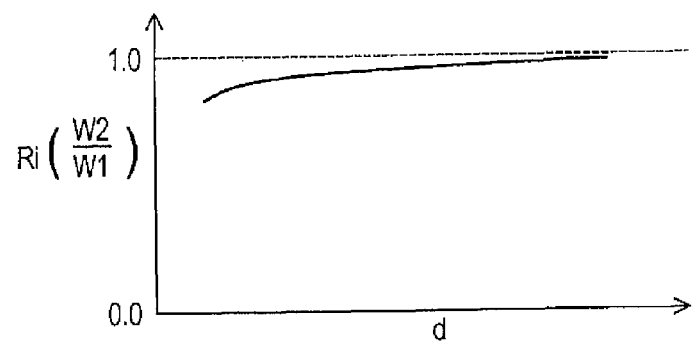

FIGS. 12A-12C show the relationship between the radius A, the radius B, or the distance d and the ratio Ri. FIG. 12A shows the relationship between the radius A and the ratio Ri when values of L, d, and B are constant. FIG. 12B shows the relationship between the radius B and the ratio Ri when values of L, d, and A are constant. FIG. 12C shows the relationship between the distance d and the ratio Ri when values of L, A, and B are constant.

The deformation process for the image of a face is desirably performed so that the impression obtained by observing the image of the face is approximated to the impression obtained by observing the actual face as much as possible. To implement such an image deformation process, it is only necessary to set the deformation quantity DQ such that the ratio Rw of the width Wd of the image of the face after deformation process to the width Wo of the image of the face before deformation process, which are shown in FIG. 10B, is equal to the ratio Ri of the second width W2 to the first width W1, which are shown in FIG. 11.

In the above described step S590 of FIG. 4, the deformation quantity setting unit 290 (FIG. 1) calculates values of A and B in the above Equations (4) and (5) from the size of the head (Wh and Dh) set in step S124. In the meantime, the deformation quantity setting unit 290 sets a value of the subject distance Sd set in step S124 to a value of d in the above Equations (4) and (5). The deformation quantity setting unit 290 uses these values to calculate the first width W1 and the second width W2, and calculates the deformation quantity DQ so that the ratio Rw (Wd/Wo) is equal to the ratio Ri (W2/W1).

Figure 13A:
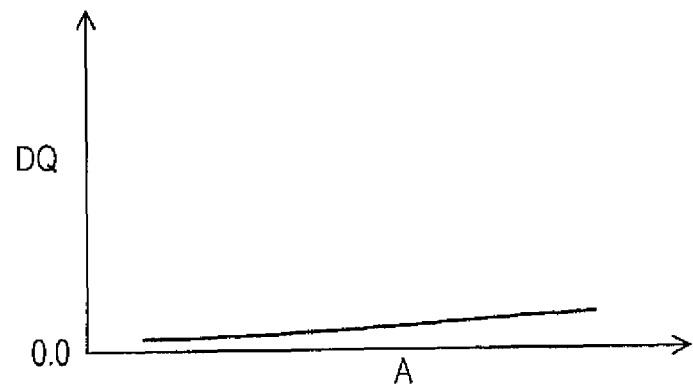
FIG. 13A to FIG. 13C are graphs that show the relationship between a radius A, a radius B, or a distance d and a deformation quantity DQ.
Figure 13B:
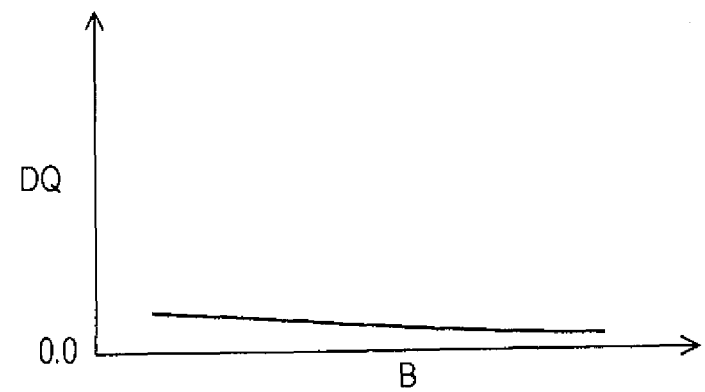
Figure 13C:
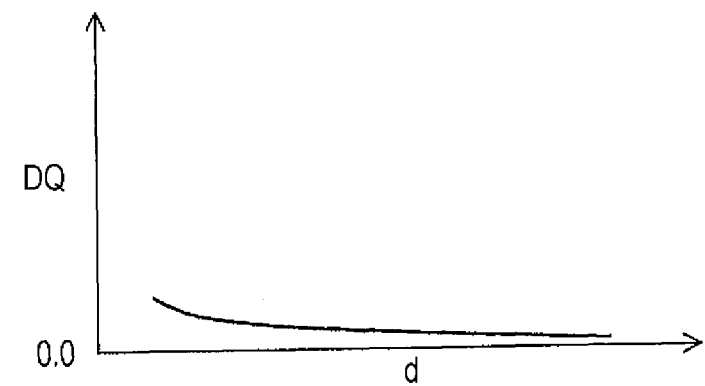

FIGS. 13A-13C show the relationship between the radius A, the radius B, or the distance d and the deformation quantity DQ. FIG. 13A shows the relationship between the radius A and the deformation quantity DQ when values of L, d and B are constant. FIG. 13B shows the relationship between the radius B and the deformation quantity DQ when values of L, d and A are constant. FIG. 13C shows the relationship between the distance d and the deformation quantity DQ when values of L, A and B are constant. As shown in FIG. 13A, when values of L, d and B are constant, the deformation quantity DQ is set to a larger value the larger a value of the radius A (the radius of the head H in the depth direction in the aspects of the invention) is. Similarly, when values of L, d and A are constant, the deformation quantity DQ is set to a larger value the smaller a value of the radius B (the radius of the head H in the width direction in the aspects of the invention) is (see FIG. 13B). When values of L, A and B are constant, the deformation quantity DQ is set to a larger value the smaller a value of the distance d is (see FIG. 13C).

In step S600 of FIG. 4, the image is deformed using the deformation quantity DQ that is determined as described above (FIG. 10B). As a result, the image deformation process is performed so that the impression obtained by observing the image of a face is approximated to the impression obtained by observing the actual face.

The "depth direction" means a direction parallel to the optical axis of the lens of the image pickup apparatus, and the "width direction" means a direction parallel to a straight line perpendicular to the optical axis of the lens of the image pickup apparatus in a horizontal plane that includes the optical axis.

Figure 14:
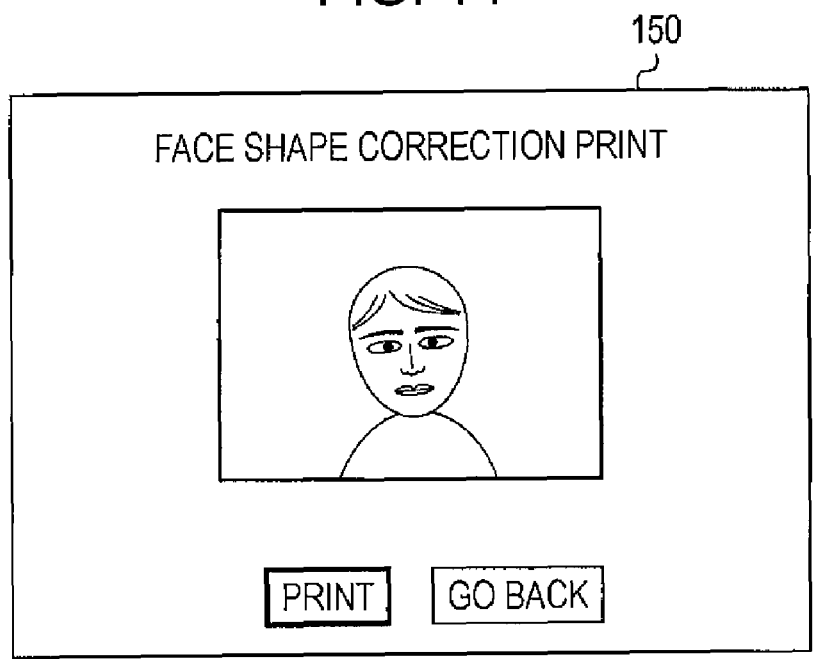
FIG. 14 is a view that illustrates one example of the state of a display unit that displays a target image on which face shape correction has been performed.

As the face shape correction process (FIG. 4) is complete, the process returns to the flowchart of FIG. 3, and the face shape correction unit 200 (FIG. 1) instructs the display processing unit 310 to make the display unit 150 display the target image TI on which the face shape correction has been executed (step S200). FIG. 14 illustrates one example of the state of the display unit 150 on which the target image TI obtained after face shape correction is displayed. Using the display unit 150 on which the target image TI, on which the face shape correction has been executed, is displayed, a user is able to confirm the corrected target image TI. When the user is not satisfied with the corrected target image TI and then selects "GO BACK" button, for example, the screen to select a deformation type and a deformation degree, shown in FIG. 5, or the screen to set the size of the head, shown in FIG. 6, is displayed on the display unit 150. Then, resetting of the deformation type, the deformation degree and the head size is performed by the user.

When the user is satisfied with the corrected target image TI and then selects the "PRINT" button, the print processing unit 320 (FIG. 1) controls the printer engine 160 to perform printing of the target image TI on which the face shape correction process has been performed (step S300 in FIG. 3). The print processing unit 320 executes a process, such as a resolution conversion or a halftone process, on the image data of the target image TI on which the face shape correction process has been executed to thereby generate print data. The generated print data is supplied from the print processing unit 320 to the printer engine 160, and then the printer engine 160 prints out the target image TI. In this manner, printing of the target image TI, on which the face shape correction has been executed, is completed.

A-3. Setting of Deformation Area

Figure 15:
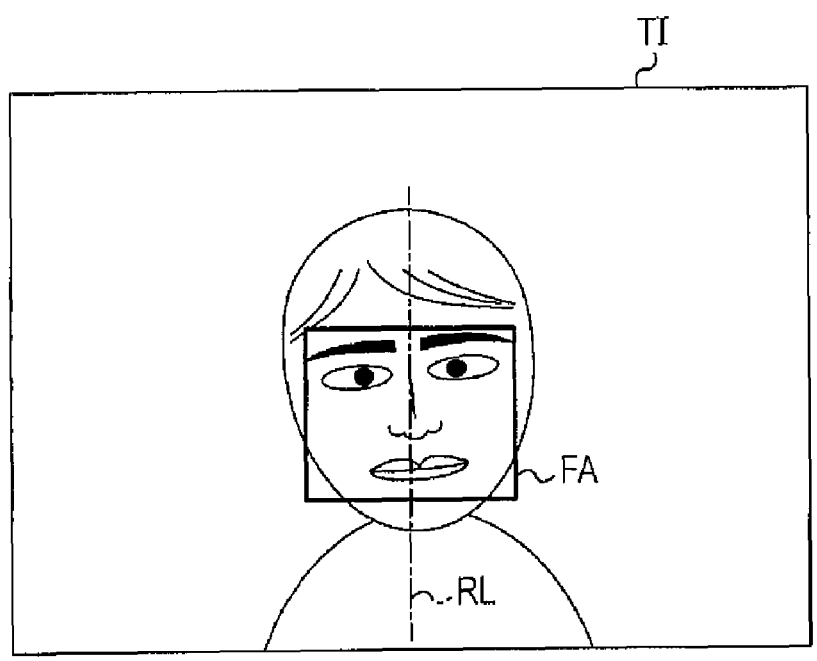
FIG. 15 is a view that illustrates one example of a detected face area.

The process of setting the deformation area TA (step S500) in the above described face shape correction process (FIG. 4) is now specifically described. FIG. 15 illustrates one example of a detected face area FA. As shown in FIG. 15, in step S130 of FIG. 4, the face area FA is detected from the target image TI. The reference line RL shown in FIG. 15 defines the height direction (vertical direction) of the face area FA and indicates the center of the width direction (lateral direction) of the face area FA. That is, the reference line RL is a straight line that passes through the center of gravity of the rectangular face area FA and is parallel to the boundary lines that extend along the height direction (vertical direction) of the face area FA.

The deformation area TA is set on the basis of the face area FA. Here, as described above, a known face detection method, such as a method through pattern matching using templates, used to detect the face area FA does not minutely detect the position or inclination (angle) of the entire face or portions of a face (eyes, a mouth, or the like) but sets an area in the target image TI, in which it may be regarded that the image of a face is substantially included, as the face area PA. On the other hand, because generally the image of a face highly attracts a viewer's attention, there is a possibility that an image on which face shape correction has been performed may be unnatural depending on the relationship in position and/or angle between the deformation area TA set on the basis of the face area FA and the image of a face. Then, in the present example embodiment, in order to achieve more natural and desirable face shape correction, position adjustment and inclination adjustment described below are performed on the face area FA that has been detected in step S130.

Figure 16:
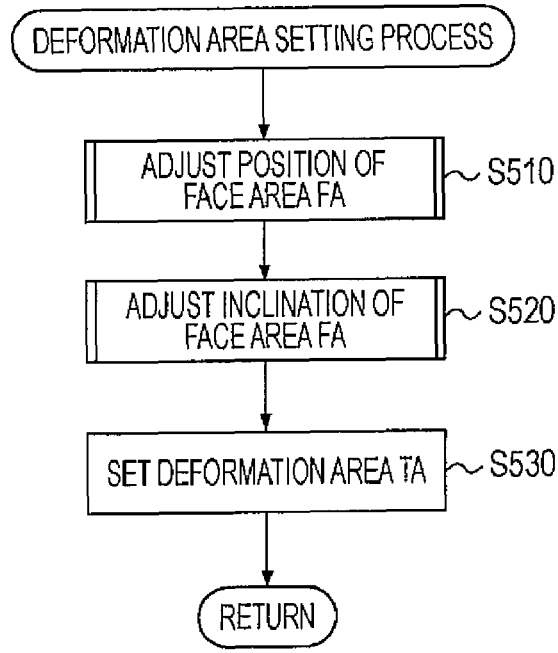
FIG. 16 is a flowchart of a deformation area setting process.

FIG. 16 is a flowchart of a deformation area setting process. In step S510, the face area adjustment unit 230 (FIG. 1) adjusts the position, in the height direction, of the face area FA that has been detected in step S130 (FIG. 4). Here, the adjustment of position of the face area FA in the height direction means resetting the face area FA in the target image TI by adjusting the position of the face area FA along the reference line RL (see FIG. 15).

Figure 17:
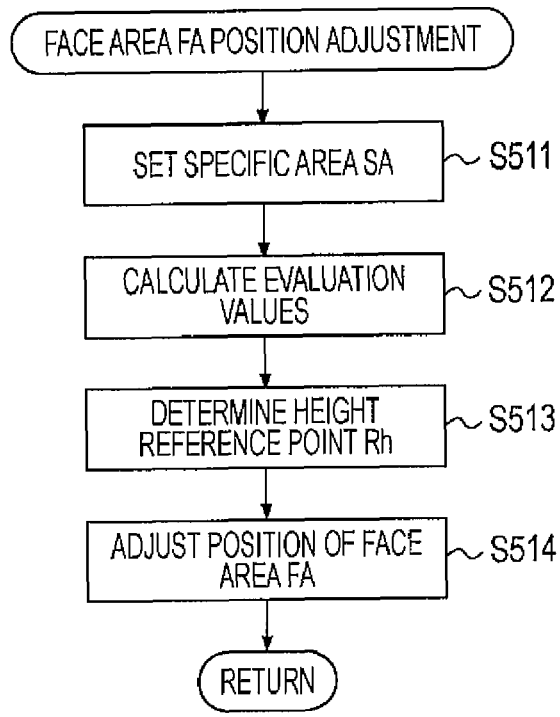
FIG. 17 is a flowchart of a position adjustment process in which the position of the face area in the height direction is adjusted.

FIG. 17 is a flowchart of a position adjustment process in which the position of the face area FA in the height direction is adjusted. In step S511, the face area adjustment unit 230 (FIG. 1) sets a specific area SA. Here, the specific area SA is an area on the target image TI and is an area that includes an image of a predetermined reference subject that is referenced when the adjustment of position of the face area FA in the height direction is executed. The reference subject may be set to "eyes", and, in this case, the specific area SA is set to an area that includes the image of "eyes".

Figure 18:
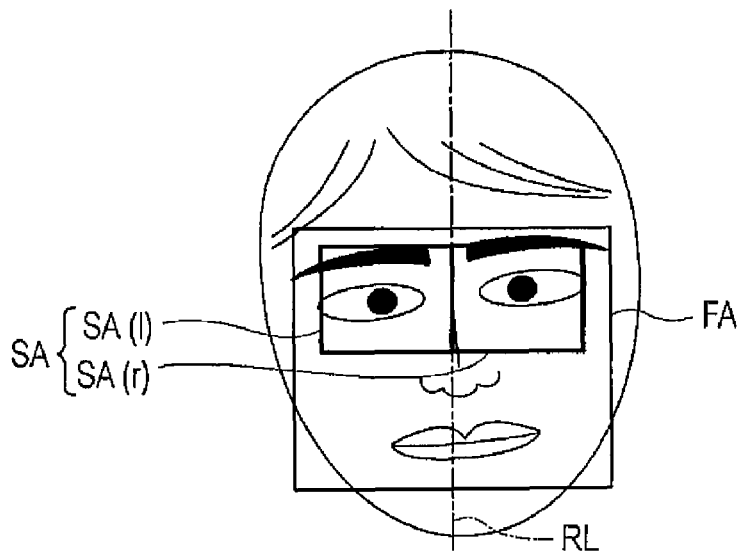
FIG. 18 is a view that illustrates one example of a specific area.

FIG. 18 illustrates one example of the specific area SA. In the present example embodiment, the face area adjustment unit 230 (FIG. 1) sets the specific area SA on the basis of the relationship with the face area FA. Specifically, the specific area SA is set as an area that is obtained by reducing (or enlarging) the size of the face area FA by a predetermined ratio in a direction perpendicular to the reference line RL and in a direction parallel to the reference line RL and that has a predetermined positional relationship with the position of the face area FA. That is, the predetermined ratio and the predetermined positional relationship are determined in advance so that, when the specific area SA is set on the basis of the relationship with the face area FA that is detected by the face area detection unit 220, the specific area SA includes the image of both eyes. The specific area SA is desirably set as an area as small as possible in so far as the area includes the image of both eyes so as not to include a confusing image (for example, the image of hair) with the image of eyes as much as possible.

In addition, as shown in FIG. 18, the specific area SA is set to an area having a rectangular shape that is symmetrical with respect to the reference line RL. The specific area SA is divided by the reference line RL into a left side area (hereinafter, also referred to as "left divided specific area SA(l)") and a right side area (hereinafter, also referred to as "right divided specific area SA(r)"). The specific area SA is set so that one of the eyes is included in each of the left divided specific area SA(l) and the right divided specific area SA(r).

Figure 19:
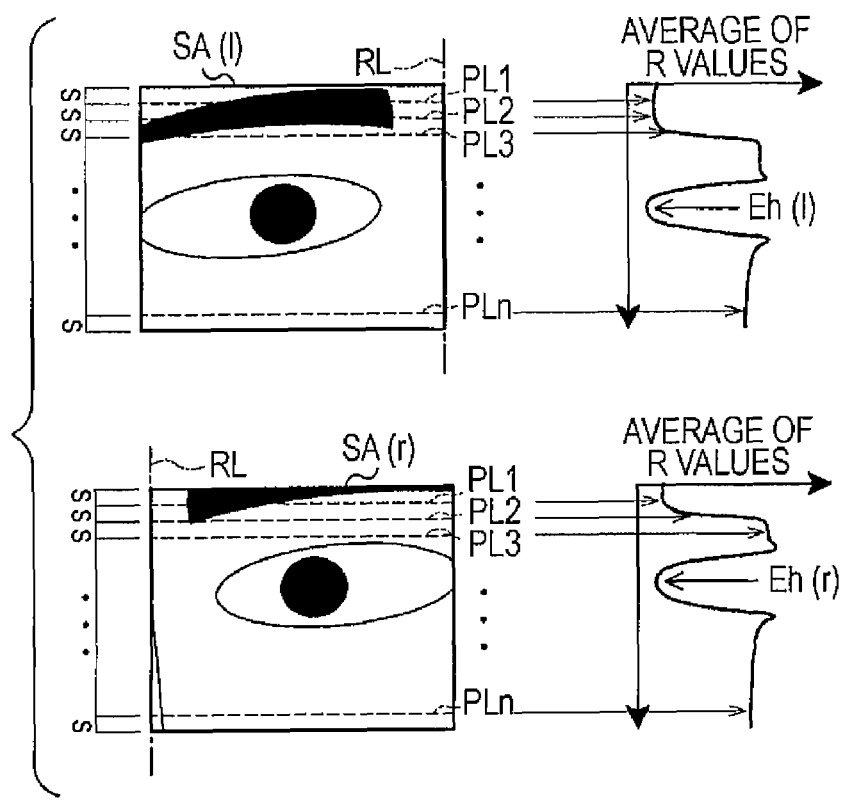
FIG. 19 is a view that illustrates one example of a method of calculating evaluation values.

In step S512 (FIG. 17), the face area adjustment unit 230 (FIG. 1) calculates evaluation values for detecting the position of the image of each eye in the specific area SA. FIG. 19 illustrates one example of a method of calculating evaluation values. In the present example embodiment, R values (R component values) of pixels of the target image TI, which are RGB image data, are used for calculation of the evaluation values. This is because there is a large difference in R values between the image of portion of a skin and the image of portion of an eye and, therefore, it may be presumed that it is possible to improve the detection accuracy of the image of an eye using R values for calculation of evaluation values. In addition, in the present example embodiment, because the data of the target image TI are acquired as RGB data, it is possible to attempt to effectively calculate evaluation values using R values for calculation of the evaluation values. As shown in FIG. 19, calculation of evaluation values is separately performed for two divided specific areas (the right divided specific area SA(r) and the left divided specific area SA(l)).

The face area adjustment unit 230, as shown in FIG. 19, sets n straight lines (hereinafter, referred to as "target pixel specifying lines PL1 to PLn") perpendicular to the reference line RL within the divided specific areas (the right divided specific area SA(r) and the left divided specific area SA(l)). The target pixel specifying lines PL1 to PLn are straight lines that equally divide the height (the size along the reference line RL) of each of the divided specific areas into (n+1) parts. That is, the interval between any adjacent target pixel specifying lines PL is an equal interval s.

The face area adjustment unit 230 selects pixels (hereinafter, referred to as "evaluation target pixels TP") used for calculation of evaluation values from among pixels that constitute the target image TI for each of the target pixel specifying lines PL1 to PLn. FIG. 20A and FIG. 20B each illustrate one example of a method of selecting evaluation target pixels TP. The face area adjustment unit 230 selects the pixels that overlap each of the target pixel specifying lines PL from among the pixels that constitute the target image TI as the evaluation target pixels TP. FIG. 20A shows the case where the target pixel specifying lines PL are parallel to the row direction (X direction in FIG. 20A) of the pixels of the target image TI. In this case, the pixels arranged in each pixel row that overlaps each of the target pixel specifying lines PL (pixels to which symbol "o" is assigned in FIG. 20A) are selected as the evaluation target pixels TP with respect to each of the target pixel specifying lines PL.

On the other hand, depending on a method of detecting the face area FA or a method of setting the specific area SA, the target pixel specifying lines PL may possibly be not parallel to the row direction (X direction) of the pixels of the target image TI, as shown in FIG. 20B. In such a case as well, as a rule, the pixels that overlap each of the target pixel specifying lines PL are selected as the evaluation target pixels TP with respect to each of the target pixel specifying lines PL. However, for example, as in the case of the relationship between a target pixel specifying line PL1 and pixels PXa and PXb, shown in FIG. 20B, when one target pixel specifying line PL overlaps two pixels arranged in the same column (that is, having the same Y coordinate) of the pixel matrix of the target image TI, one of the pixels (for example, the pixel PXb) that overlaps the target pixel specifying line PL shorter in distance than the other is excluded from the evaluation target pixel TP. That is, for each of the target pixel specifying lines PL, only one pixel is selected from one column of the pixel matrix as the evaluation target pixel TP.

When the inclination of the target pixel specifying line PL exceeds 45 degrees with respect to the X direction, the relationship between the column and row of the pixel matrix in the above description is inverted and, therefore, only one pixel is selected from one row of the pixel matrix as the evaluation target pixel TP. In addition, depending on the relationship in size between the target image TI and the specific area SA, one pixel may be selected as the evaluation target pixel TP with respect to a plurality of the target pixel specifying lines PL.

The face area adjustment unit 230 calculates the average of R values of the evaluation target pixels TP for each of the target pixel specifying lines PL. However, in the present example embodiment, with respect to each of the target pixel specifying lines PL, a portion of pixels each having a large R value within the plurality of selected evaluation target pixels TP are excluded from calculation of evaluation values. Specifically, for example, when k evaluation target pixels TP are selected with respect to one target pixel specifying line PL, the evaluation target pixels TP are separated into two groups, that is, a first group, which is composed of 0.75 k pixels each having a relatively large R value, and a second group, which is composed of 0.25 k pixels each having a relatively small R values, and then only the pixels that belong to the second group are used to calculate the average of R values as an evaluation value. The reason that a portion of evaluation target pixels TP are excluded from calculation of evaluation values will be described later.

As described above, in the present example embodiment, the evaluation value with respect to each of the target pixel specifying lines PL is calculated by the face area adjustment unit 230. Here, because the target pixel specifying lines PL are straight lines that are perpendicular to the reference line RL, the evaluation values may be expressed to be calculated with respect to a plurality of positions (evaluation positions) along the reference line RL. In addition, each of the evaluation values may be expressed as a value that represents the characteristics of distribution of pixel values arranged in a direction perpendicular to the reference line RL with respect to each of the evaluation positions.

In step S513 (FIG. 17), the face area adjustment unit 230 (FIG. 1) detects the position of each eye in the specific area SA and then determines a height reference point Rh on the basis of the detection result. First, with respect to each of the divided specific areas, the face area adjustment unit 230, as shown on the right side in FIG. 19, creates a curve that represents a distribution of evaluation values (average of R values) along the reference line RL and then detects a position, at which the evaluation value takes a minimum value along the direction of reference line RL, as an eye position Eh. Note that the eye position Eh in the left divided specific area SA(l) is denoted as Eh(l) and the eye position Eh in the right divided specific area SA(r) is denoted as Eh(r).

In the case of the yellow human race, it may be presumed that the portion that displays the image of a skin in the divided specific area has a large R value, while, on the other hand, the portion that displays the image of an eye (more specifically, black eye portion of the center of each eye) has a small R value. Therefore, as described above, the position, at which the evaluation value (the average of R values) takes a minimum value along the reference line RL, may be determined as the eye position Eh. However, when the process is intended for other human races (white race or black race), other evaluation values (for example, luminance, lightness, B value, or the like) are used.

As shown in FIG. 19, the divided specific area may possibly include another image (for example, the image of an eyebrow or the image of hair) having a small R value, in addition to the image of an eye. For this reason, the face area adjustment unit 230, when the curve that represents a distribution of evaluation values along the reference line RL takes multiple minimum values, determines the position that is located on the lowest side among the positions that take minimum values as the eye position Eh. Because, in general, it is presumed that images, such as an eyebrow or hair, having small R values are mostly located on the upper side than the image of an eye, while, on the other hand, images having small R values are rarely located on the lower side than the image of an eye, the above described determination is possible.

In addition, even when the above curve is located on the lower side (mainly, a position corresponding to the image of a skin) than the position of the image of an eye, because there is a possibility that the curve may take a minimum value despite its large evaluation value, minimum values that exceed a predetermined threshold value may be ignored. Alternatively, the position of the target pixel specifying line PL, which corresponds to a minimum value among evaluation values calculated with respect to each of the target pixel specifying lines PL, may be simply determined as the eye position Eh.

In the present example embodiment, an eye (a black eye portion of the center of each eye), at which it may be presumed that a difference in color from its surrounding is large in the face, is used as a reference subject for adjusting the position of the face area FA. However, because the average value of R values as the evaluation value is calculated for the plurality of evaluation target pixels TP on each of the target pixel specifying lines PL, there is a possibility that the accuracy of detection of a black eye portion may be deteriorated, for example, due to the influence of an image of a white eye portion that surrounds the black eye. In the present example embodiment, as described above, the accuracy of detection of a reference subject is further improved in such a manner that a portion of evaluation target pixels TP (for example, pixels having a relatively large R value, belonging to the above described first group), which may be regarded to have a large color difference in comparison with the reference subject, are excluded from calculation of evaluation values.

Next, the face area adjustment unit 230 determines a height reference point Rh on the basis of the detected eye position Eh. FIG. 21 illustrates one example of a method of determining a height reference point Rh. The height reference point Rh is a point used as a reference when the position of the face area FA in the height direction is adjusted. In the present example embodiment, as shown in FIG. 21, the point that is located at the middle of the positions Eh(l) and Eh(r) of the two right and left eyes on the reference line RL is set as the height reference point Rh. That is, the middle point of the intersection point of a straight line EhL(l), which indicates the left eye position Eh(l), and the reference line RL and the intersection point of a straight line EhL(r), which indicates the right eye position Eh(r), and the reference line RL is set as the height reference point Rh.

Figure 22:
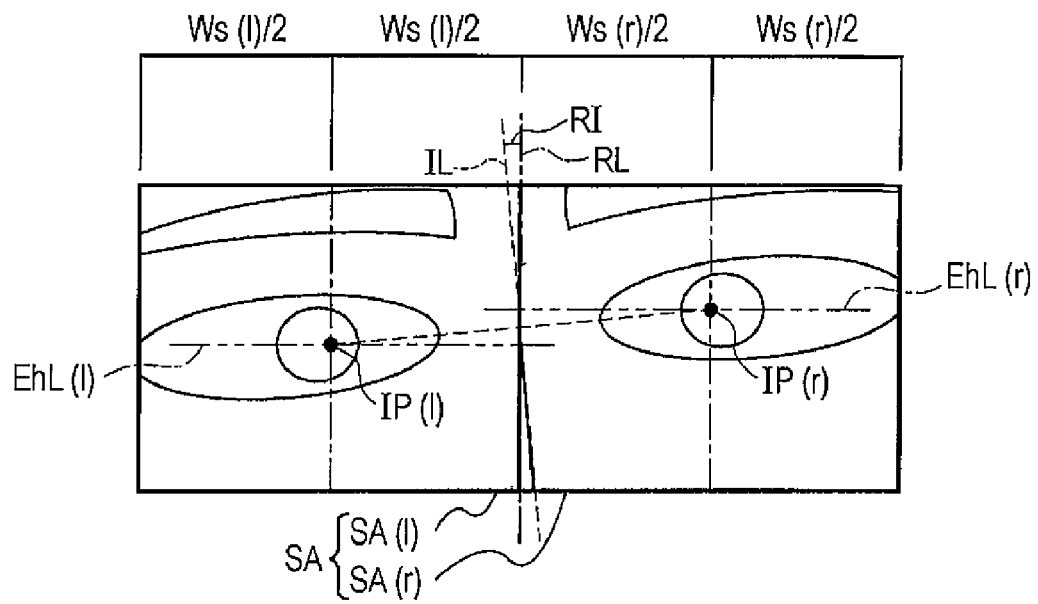
FIG. 22 is a view that illustrates one example of a method of calculating an approximate inclination angle.

In the present example embodiment, the face area adjustment unit 230 calculates an approximate inclination angle (hereinafter, referred to as "approximate inclination angle RI") of a face image on the basis of the detected eye position Eh. The approximate inclination angle RI of a face image is an angle that is obtained by estimating how many angles at which the image of a face in the target image TI is approximately inclined with respect to the reference line RL of the face area FA. FIG. 22 illustrates one example of a method of calculating an approximate inclination angle RI. As shown in FIG. 22, the face area adjustment unit 230 first determines an intersection point IP(l) of a straight line, which divides the width Ws(l) of the left divided specific area SA(l) in half, and the straight line EhL(l) and an intersection point IP(r) of a straight line, which divides the width Ws(r) of the right divided specific area SA(r) in half, and the straight line EhL(r). Then, an angle that is made by a straight line IL perpendicular to the straight line that connects the intersection point IP(l) and the intersection point IP(r) with the reference line RL is calculated as the approximate inclination angle RI.

Figure 23:
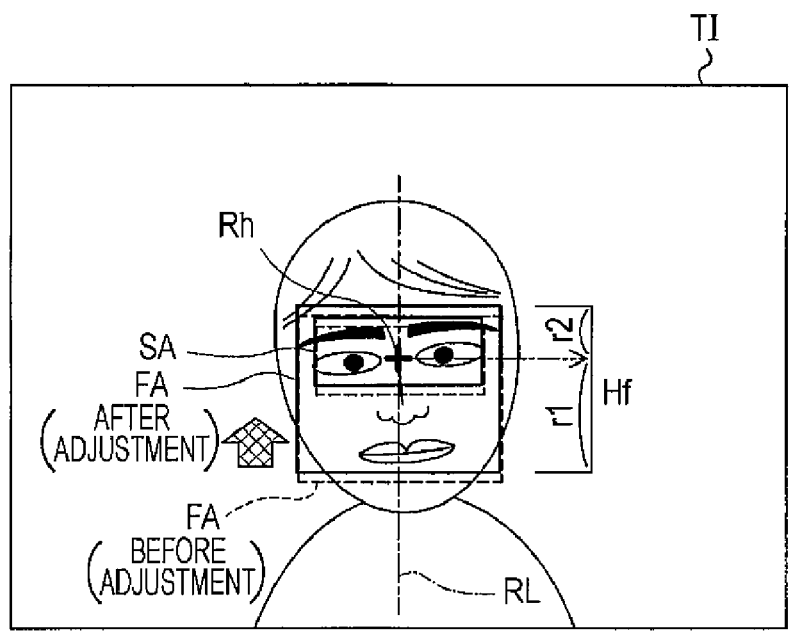
FIG. 23 is a view that illustrates one example of a method of adjusting the position of the face area in the height direction.

In step S514 (FIG. 17), the face area adjustment unit 230 (FIG. 1) adjusts the position of the face area FA in the height direction. FIG. 23 illustrates one example of a method of adjusting the position of the face area FA in the height direction. The adjustment of the position of the face area FA in the height direction is performed in such a manner that the face area FA is reset so that the height reference point Rh is located at a predetermined position in the face area FA of which the position has been adjusted. Specifically, as shown in FIG. 23, the position of the face area FA is adjusted upward or downward along the reference line RL so that the height reference point Rh is located at a position at which the height Hf of the face area FA is divided by a predetermined ratio of r1 to r2. In the example shown in FIG. 23, by moving the face area FA, of which the position has not yet been adjusted as shown by the dotted line, upward, the face area FA, of which the position is adjusted as shown by the solid line, is reset.

After the position of the face area FA has been adjusted, in step S520 (FIG. 16), the face area adjustment unit 230 (FIG. 1) adjusts (angle adjustment) the inclination of the face area FA. Here, the adjustment of inclination of the face area FA means resetting the face area FA so that the inclination of the face area FA in the target image TI is adjusted to conform to the inclination of the image of the face. In the present example embodiment, the predetermined reference subject that is referenced when the adjustment of inclination of the face area FA is executed is set to "both eyes". In the adjustment of inclination of the face area FA according to the present example embodiment, a plurality of evaluation directions that represent the choices of adjustment angles of inclination are set, and the evaluation specific area ESA corresponding to each of the evaluation directions is set as an area that includes the image of both eyes. Then, in regard to each of the evaluation directions, evaluation values are calculated on the basis of pixel values of the image of the evaluation specific area ESA, and then the inclination of the face area FA is adjusted using the adjustment angle of inclination determined on the basis of the evaluation values.

Figure 24:
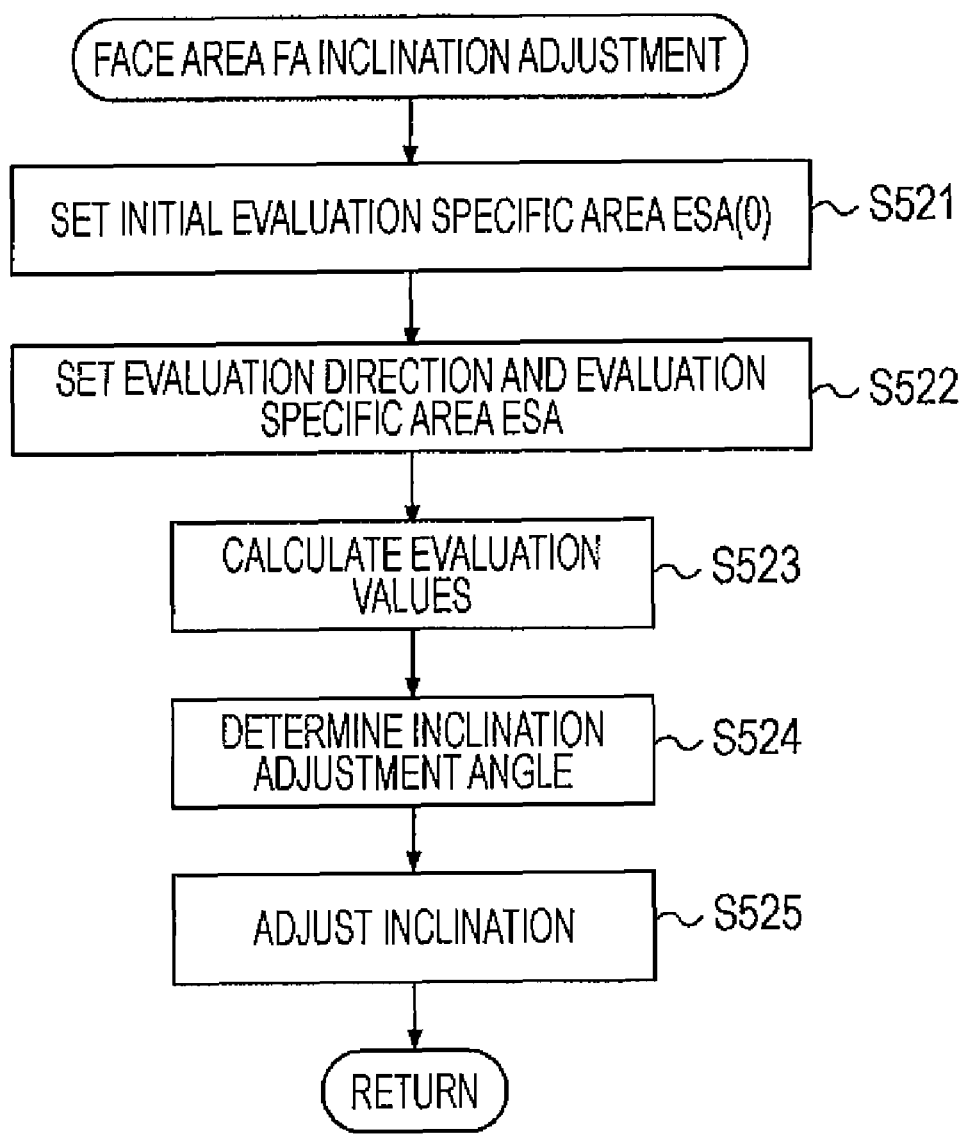
FIG. 24 is a flowchart of an inclination adjustment process in which the inclination of the face area is adjusted according to the present example embodiment.
Figure 25:
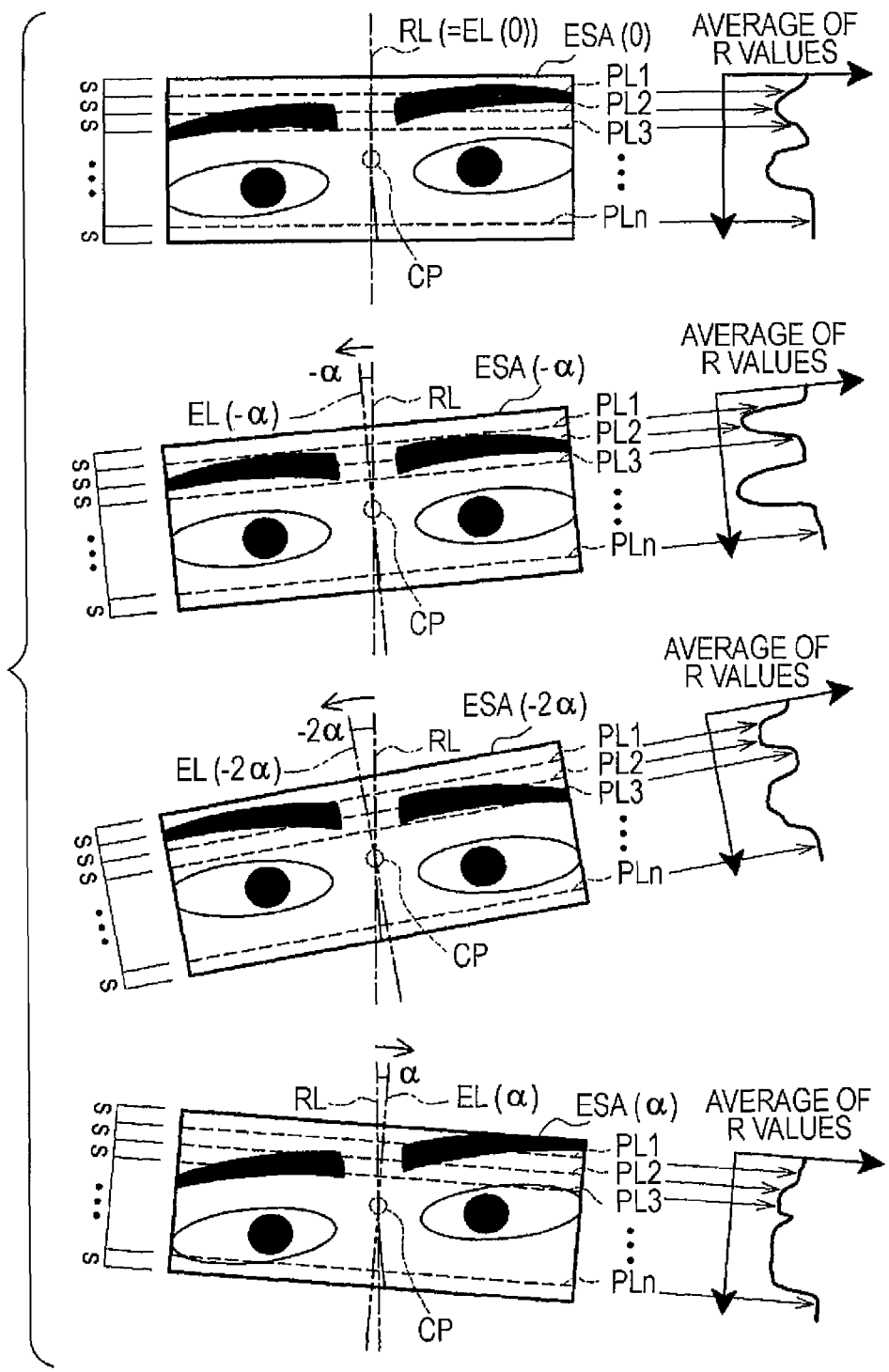
FIG. 25 is a view that illustrates one example of a method of calculating evaluation values used for adjusting the inclination of the face area.

FIG. 24 is a flowchart of an inclination adjustment process to adjust the inclination of the face area FA according to the present example embodiment. FIG. 25 illustrates one example of a method of calculating evaluation values used for adjusting the inclination of the face area FA. In step S521 (FIG. 24), the face area adjustment unit 230 (FIG. 1) sets an initial evaluation specific area ESA(0). The initial evaluation specific area ESA(0) is an evaluation specific area ESA that is associated with a direction (hereinafter, also referred to as "initial evaluation direction") parallel to the reference line RL (see FIG. 23) that is obtained after the position of the face area FA has been adjusted. In the present example embodiment, the specific area SA (see FIG. 23) corresponding to the face area FA of which the position has been adjusted is directly set as the initial evaluation specific area ESA(0). Note that the evaluation specific area ESA used for adjusting the inclination of the face area FA is not divided into two right and left areas, different from the specific area SA that is used when the position of the face area FA is adjusted. The set initial evaluation specific area ESA(0) is shown in the uppermost drawing of FIG. 25.

In step S522 (FIG. 24), the face area adjustment unit 230 (FIG. 1) sets a plurality of evaluation directions and an evaluation specific area ESA corresponding to each of the evaluation directions. The plurality of evaluation directions are set as directions that represent the choices of adjustment angles of inclination. In the present example embodiment, a plurality of evaluation direction lines EL, of which an angle that is made with the reference line RL falls within a predetermined range, are set, and directions parallel to the evaluation direction lines EL are set as evaluation directions. As shown in FIG. 25, straight lines that are determined in such a manner that the reference line RL is rotated about the center point (center of gravity) CP of the initial evaluation specific area ESA(0) on a predetermined angle α basis in a counterclockwise direction or in a clockwise direction are set as the plurality of evaluation direction lines EL. Note that the evaluation direction line EL of which an angle that is made with the reference line RL is φ degrees is denoted as EL(φ).

In the present example embodiment, the above described predetermined range with respect to an angle that is made by each evaluation direction line EL with the reference line RL is set to a range of ±20 degrees. Here, in this description, a rotation angle is indicated by a positive value when the reference line RL is rotated in a clockwise direction, and a rotation angle is indicated by a negative value when the reference line RL is rotated in a counterclockwise direction. The face area adjustment unit 230 rotates the reference line RL in a counterclockwise direction or in a clockwise direction while increasing a rotation angle like α degrees, 2α degrees, . . . , within a range that does not exceed 20 degrees to thereby set the plurality of evaluation direction lines EL. FIG. 25 shows the evaluation direction lines EL (EL(-α), EL(-2α), EL(α)) that are respectively determined by rotating the reference line RL at -α degrees, -2α degrees, and α degrees. The reference line RL may also be expressed as an evaluation direction line EL(0).

The evaluation specific area ESA corresponding to the evaluation direction line EL that represents each of the evaluation directions is obtained by rotating the initial evaluation specific area ESA(O) about the center point CP at the same angle as the rotation angle when the evaluation direction line EL is set. The evaluation specific area ESA corresponding to the evaluation direction line EL(φ) is denoted as an evaluation specific area ESA(φ). FIG. 25 shows the evaluation specific areas ESA (ESA(-α), ESA(-2α), and ESA(α)) that respectively correspond to the evaluation direction lines EL(-α), EL(-2α), and EL(α). The initial evaluation specific area ESA (0) is also treated as one of the evaluation specific areas ESA.

In step S523 (FIG. 24), the face area adjustment unit 230 (FIG. 1) calculates evaluation values on the basis of pixel values of an image of the evaluation specific area ESA with respect to each of the plurality of set evaluation directions. In the present example embodiment, the average values of R values are used as evaluation values for adjusting the inclination of the face area FA as in the case of the above described evaluation value for adjusting the position of the face area FA. The face area adjustment unit 230 calculates evaluation values for the plurality of evaluation positions located along the evaluation direction.

The method of calculating the evaluation value is the same as the above described method of calculating the evaluation value for adjusting the position of the face area FA. That is, the face area adjustment unit 230, as shown in FIG. 25, sets the target pixel specifying lines PL1 to PLn perpendicular to the evaluation direction line EL within each of the evaluation specific areas ESA, selects the evaluation target pixels TP with respect to each of the target pixel specifying lines PL1 to PLn, and then calculates the average of R values of the selected evaluation target pixels TP as the evaluation value.

A method of setting the target pixel specifying lines PL within the evaluation specific area ESA or a method of selecting the evaluation target pixels TP are similar to the method of adjusting the position of the face area FA shown in FIG. 19, FIG. 20A and FIG. 20B except whether an area is divided into right and left areas. As in the case of the adjustment of position of the face area FA, a portion of the selected evaluation target pixels TP (for example, 0.75 k pixels having a relatively large R values among the evaluation target pixels TP) may be excluded from calculation of evaluation values. On the right side of FIG. 25, in regard to each of the evaluation directions, a distribution of the calculated evaluation values along the evaluation direction line EL is shown.

The target pixel specifying line PL is a straight line perpendicular to the evaluation direction line EL, so that the evaluation values may be calculated with respect to a plurality of positions (evaluation positions) along the evaluation direction line EL. In addition, the evaluation value may be regarded as a value that represents the characteristics of a distribution of pixel values along the direction perpendicular to the evaluation direction line EL with respect to each of the evaluation positions.

In step S524 (FIG. 24), the face area adjustment unit 230 (FIG. 1) determines an adjustment angle that is used to adjust the inclination of the face area FA. With respect to each of the evaluation directions, the face area adjustment unit 230 calculates a distribution of the evaluation values, calculated in step S523, along the evaluation direction line EL and selects an evaluation direction that has a maximum variance. Then, an angle made by the evaluation direction line EL, which corresponds to the selected evaluation direction, with the reference line RL is determined as an adjustment angle used for adjusting the inclination.

Figure 26:
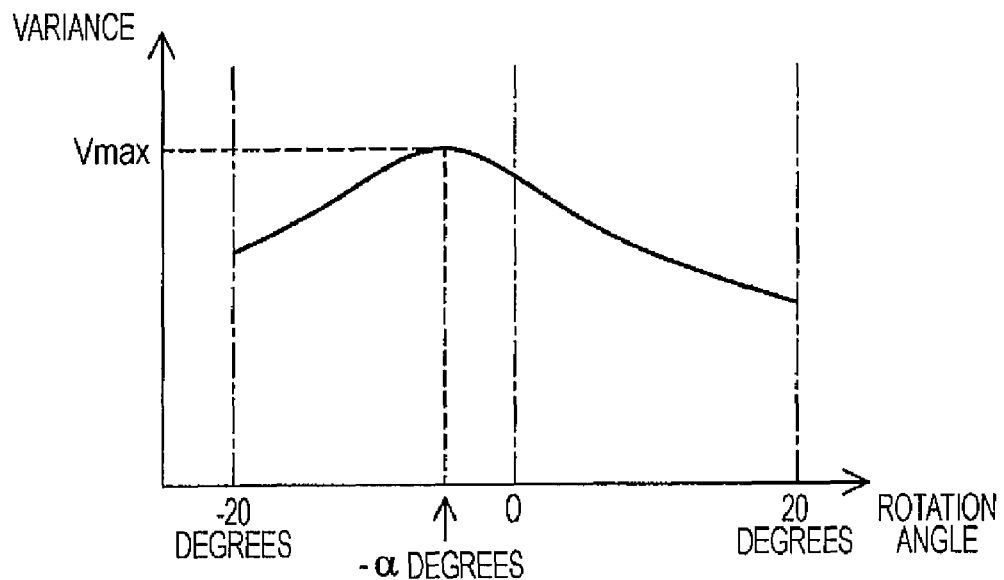
FIG. 26 is a view that illustrates one example of a calculated variance of evaluation values with respect to each evaluation direction.

FIG. 26 illustrates one example of the calculation result of variance of evaluation values with respect to each evaluation direction. In the example shown in FIG. 26, the variance takes a maximum value Vmax in the evaluation direction of which the rotation angle is $-\alpha$ degrees. Thus, $-\alpha$ degrees, that is, a rotation angle of $\alpha$ degrees in a counterclockwise direction is determined as an adjustment angle used for adjusting the inclination of the face area FA.

The reason that an angle corresponding to the evaluation direction in which the value of a variance of evaluation values becomes maximal is determined as an adjustment angle used for adjusting the inclination is now described. As shown by the second drawing of FIG. 25 from the upper side, in the evaluation specific area ESA($-\alpha$) in which the rotation angle is $-\alpha$ degrees, the images of the center portions (black eye portions) of right and left eyes are arranged so that they are aligned in a direction substantially parallel to the target pixel specifying line PL (that is, a direction perpendicular to the evaluation direction line EL). In addition, at this time, similarly, the images of right and left eyebrows are also arranged so that they are aligned in a direction substantially perpendicular to the evaluation direction line EL. Accordingly, the evaluation direction corresponding to the evaluation direction line EL at this time may be regarded as a direction that substantially represents the inclination of a face image. At this time, the positional relationship between the image of an eye or an eyebrow generally having small R values and the image of a skin portion generally having large R values will be a positional relationship in which both of the images have less overlapping portions along the direction of the target pixel specifying line PL. Therefore, the evaluation value at a position of the image of an eye or an eyebrow is relatively small, and the evaluation value at a position of the image of a skin portion is relatively large. Thus, the distribution of evaluation values along the evaluation direction line EL will be a distribution having a relatively large dispersion (large amplitude), as shown in FIG. 25, and the value of a variance becomes large.

On the other hand, as shown in the uppermost, third and fourth drawings of FIG. 25, in the evaluation specific areas ESA(0), ESA($-2\alpha$), and ESA($\alpha$) in which the rotation angles are respectively 0 degree, $-2\alpha$ degrees, and $\alpha$ degrees, the images of the center portions of right and left eyes or the images of right and left eyebrows are not aligned in a direction perpendicular to the evaluation direction line EL but deviated from each other. Thus, the evaluation direction corresponding to the evaluation direction line EL at this time does not represent the inclination of the face image. At this time, the positional relationship between the image of an eye or an eyebrow generally having small R values and the image of a skin portion generally having large R values will be a positional relationship in which both of the images have much overlapping portions along the direction of the target pixel specifying line PL. Thus, the distribution of evaluation values along the evaluation direction line EL will be a distribution having a relatively small dispersion (small amplitude), as shown in FIG. 25, and the value of a variance becomes small.

As described above, when the evaluation direction is close to the direction of inclination of the face image, the value of a variance of the evaluation values along the evaluation direction line EL becomes large, and, when the evaluation direction is remote from the direction of inclination of the face image, the value of a variance of the evaluation values along the evaluation direction line EL becomes small. Thus, when an angle corresponding to the evaluation direction in which the value of a variance of the evaluation values becomes maximum is determined as an adjustment angle used for adjusting the inclination, it is possible to realize such the adjustment of inclination of the face area FA that the inclination of the face area FA conforms to the inclination of the face image.

In the present example embodiment, when the calculation result of the variance of the evaluation values is a critical value within the range of angles, that is, the calculation result becomes a maximum value at an angle of $-20$ degrees or 20 degrees, it may be presumed that the inclination of a face is probably not properly evaluated. Thus, the adjustment of inclination of the face area FA is not executed in this case.

In addition, in the present example embodiment, the determined adjustment angle is compared with the approximate inclination angle RI that has been calculated when the position of the face area FA is adjusted as described above. When a difference between the adjustment angle and the approximate inclination angle RI is larger than a predetermined threshold value, it may be presumed that an error has occurred when evaluation or determination has been made in adjusting the position of the face area FA or in adjusting the inclination thereof. Thus, the adjustment of position of the face area FA and the adjustment of inclination thereof are not executed in this case.

Figure 27:
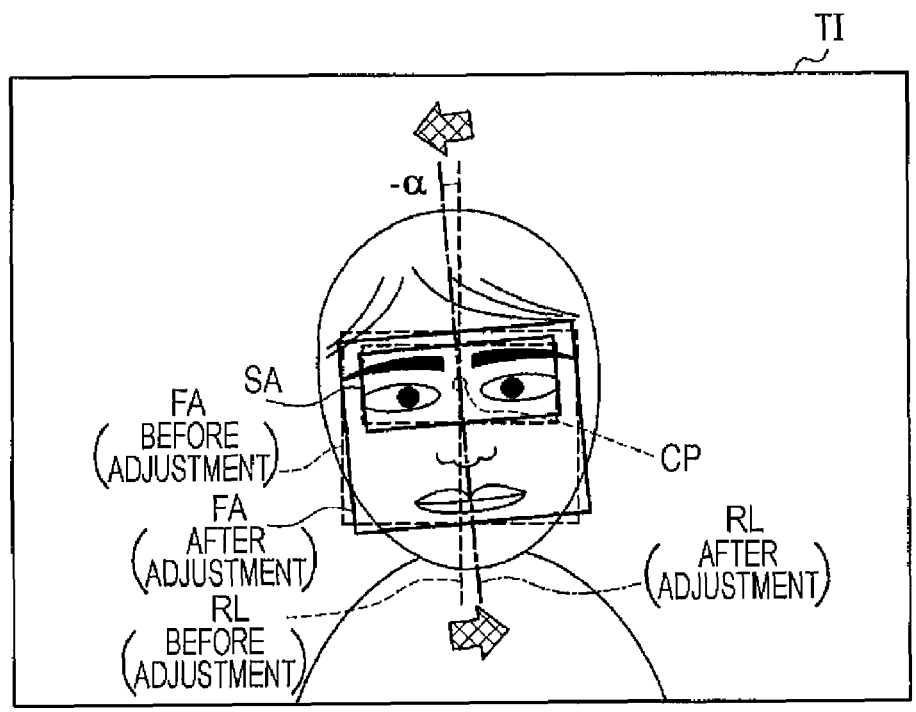
FIG. 27 is a view that illustrates one example of a method of adjusting the inclination of the face area.

In step S525 (FIG. 24), the face area adjustment unit 230 (FIG. 1) adjusts the inclination of the face area FA. FIG. 27 illustrates one example of a method of adjusting the inclination of the face area FA. The adjustment of inclination of the face area FA is performed in such a manner that the face area FA is rotated about the center point CP of the initial evaluation specific area ESA(0) by the adjustment angle that is determined in step S524. In the example of FIG. 27, by rotating the face area FA of which the angle has not yet been adjusted, indicated by the broken line, in a counterclockwise direction by α degrees, the face area FA of which the angle has been adjusted, indicated by the solid line, is set.

Figure 28:
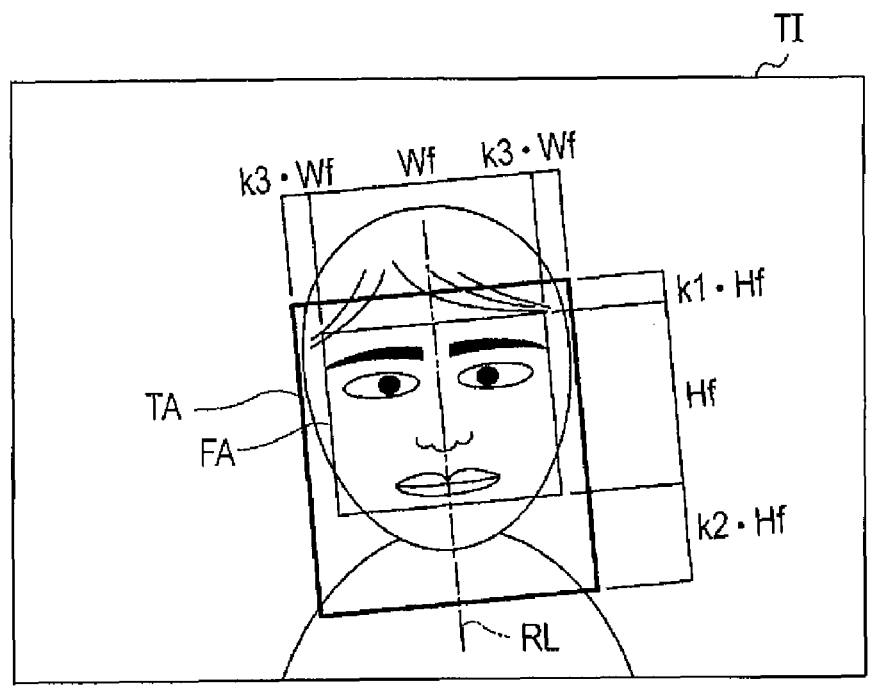
FIG. 28 is a view that illustrates one example of a method of setting a deformation area.

In step 530 (FIG. 16) after the adjustment of inclination of the face area FA has been completed, the deformation area setting unit 240 (FIG. 1) sets a deformation area TA. The deformation area TA is an area on the target image TI and is an area on which image deformation processing is performed for face shape correction. FIG. 28 illustrates one example of a method of setting the deformation area TA. As shown in FIG. 28, in the present example embodiment, the deformation area TA is set as an area such that the face area FA is extended (or contracted) in a direction parallel to the reference line RL (height direction) and in a direction perpendicular to the reference line RL (width direction). Specifically, where the size of the face area FA in the height direction is Hf, the size of the face area FA in the width direction is Wf, an area that is obtained by extending the face area FA upward by an amount of k1·Hf and downward by an amount of k2·Hf and by extending the face area FA to the right side and to left side, respectively, by an amount of k3·Wf is set as the deformation area TA. Note that k1, k2, and k3 are predetermined coefficients.

When the deformation area TA is set in this manner, the reference line RL, which is a straight line parallel to the contour line of the face area FA in the height direction, will be a straight line that is also parallel to the contour line of the deformation area TA in the height direction. In addition, the reference line RL becomes a straight line that divides the width of the deformation area TA in half.

As shown in FIG. 28, the deformation area TA is set to include the image substantially from the jaw to the forehead with respect to the height direction and includes the images of right and left cheeks with respect to the width direction. That is, in the present example embodiment, the above coefficients k1, k2, and k3 are set in advance on the basis of the relationship with the size of the face area FA so that the deformation area TA becomes an area that substantially includes the image of the above described range.

A-4. Deformation Process

Figure 29:
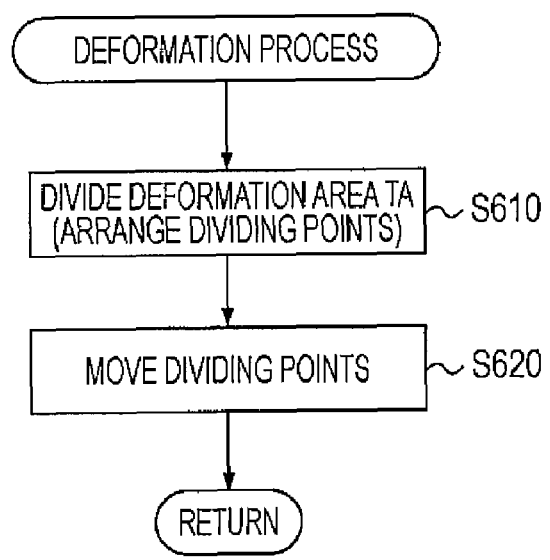
FIG. 29 is a flowchart that shows the flow of the deformation process.
Figures 30, 31:
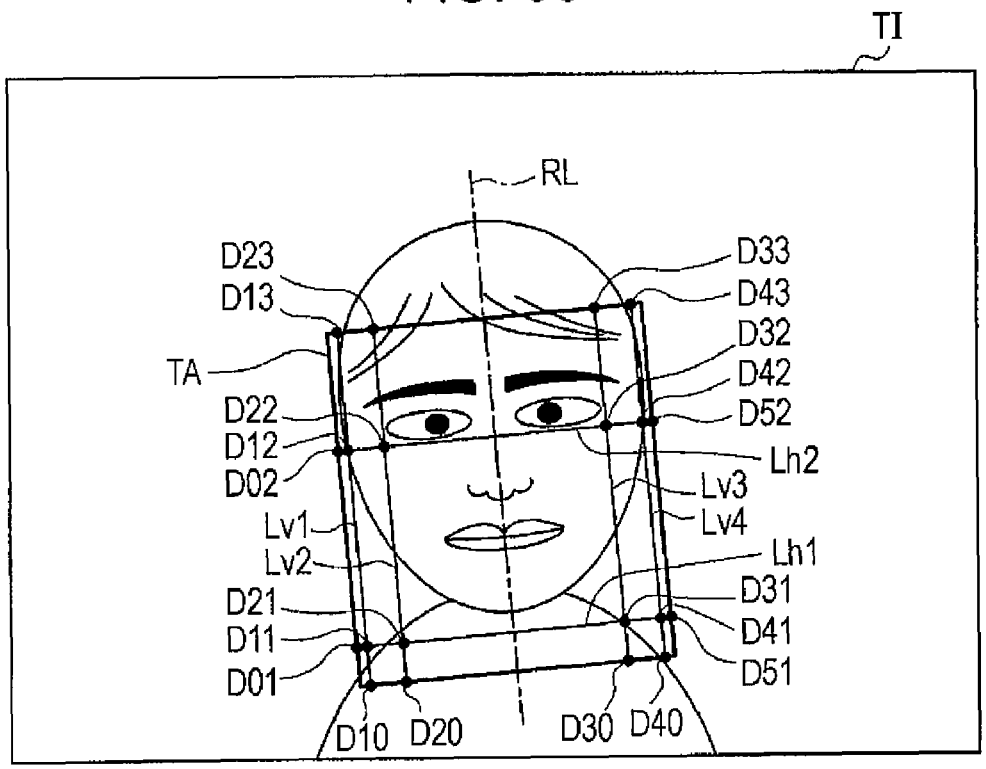
FIG. 30 is a view that illustrates one example of a method of dividing the deformation area into small areas.
FIG. 31 is a view that illustrates one example of the content of a dividing point moving table.

The deformation process (step S600) in the above described face shape correction process (FIG. 4) is now specifically described. FIG. 29 is a flowchart of the deformation process. In step S610, the deformation area dividing unit 250 (FIG. 1) divides the deformation area TA into a plurality of small areas. FIG. 30 illustrates one example of a method of dividing the deformation area TA into small areas. The deformation area dividing unit 250 arranges a plurality of dividing points D in the deformation area TA and then divides the deformation area TA into a plurality of small areas using the straight lines that connect the dividing points D.

The mode of arrangement of the dividing points D (the number and positions of the dividing points D) is defined in the dividing point arrangement pattern table 410 (FIG. 1) in association with a deformation type that is set in step S120 (FIG. 4). The deformation area dividing unit 250 references the dividing point arrangement pattern table 410 and then arranges dividing points D in the mode that is associated with the deformation type set in step S120. In the present example embodiment, as described above, because the deformation "type A" (see FIG. 5) for sharpening a face is set as the deformation type, the dividing points D are arranged in the mode that is associated with this deformation type.

As shown in FIG. 30, the dividing points D are arranged at intersections of horizontal dividing lines Lh and vertical dividing lines Lv and at intersections of the horizontal dividing lines Lh or vertical dividing lines Lv and the outer frame line of the deformation area TA. Here, the horizontal dividing lines Lh and the vertical dividing lines Lv are reference lines for arranging the dividing points D in the deformation area TA. As shown in FIG. 30, in arranging the dividing points D that are associated with the deformation type for sharpening a face, two horizontal dividing lines Lh perpendicular to the reference line RL and four vertical dividing lines Lv parallel to the reference line RL are set. The two horizontal dividing lines Lh are denoted as Lh1, Lh2 in the order from the lower side of the deformation area TA. In addition, the four vertical dividing lines Lv are denoted as Lv1, Lv2, Lv3, and Lv4 in the order from the left side of the deformation area TA.

In the deformation area TA, the horizontal dividing line Lh1 is arranged on the lower side relative to the image of the jaw, and the horizontal dividing line Lh2 is arranged immediately below the images of the eyes. In addition, the vertical dividing lines Lv1 and Lv4 each are arranged outside the image of the line of the cheek, and the vertical dividing lines Lv2 and Lv3 each are arranged outside the image of the outer corner of the eye. The arrangement of the horizontal dividing lines Lh and vertical dividing lines Lv is executed in accordance with the correspondence relationship with the size of the deformation area TA that is set in advance so that the positional relationship between the horizontal dividing lines Lh or vertical dividing lines Lv and the image eventually becomes the above described positional relationship.

In accordance with the above described arrangement of the horizontal dividing lines Lh and vertical dividing lines Lv, the dividing points D are arranged at the intersections of the horizontal dividing lines Lh and the vertical dividing lines Lv and at the intersections of the horizontal dividing lines Lh or vertical dividing lines Lv and the outer frame line of the deformation area TA. As shown in FIG. 30, the dividing points D that are located on the horizontal dividing line Lhi (i=1 or 2) are denoted as D0i, D1i, D2i, D3i, D4i, and D5i in the order from the left side. For example, the dividing points. D that are located on the horizontal dividing line Lh1 are denoted as D01, D11, D21, D31, D41, and D51. Similarly, the dividing points that are located on the vertical dividing line Lvj (j=any one of 1, 2, 3, and 4) are denoted as Dj0, Dj1, Dj2, and Dj3 in the order from the lower side. For example, the dividing points D that are located on the vertical dividing line Lv1 are denoted as D10, D11, D12, and D13.

As shown in FIG. 30, the dividing points D in the present example embodiment are arranged symmetrically with respect to the reference line RL.

The deformation area dividing unit 250 divides the deformation area TA into a plurality of small areas using the straight lines that connect the arranged dividing points D (that is, the horizontal dividing lines Lh and the vertical dividing lines Lv). In the present example embodiment, as shown in FIG. 30, the deformation area TA is divided into 15 rectangular small areas.

In the present example embodiment, because the arrangement of the dividing points D is determined on the basis of the number and positions of the horizontal dividing lines Lh and vertical dividing lines Lv, the dividing point arrangement pattern table 410 may be regarded as defining the number and positions of the horizontal dividing lines Lh and vertical dividing lines Lv.

In step S620 (FIG. 29), the divided area deformation unit 260 (FIG. 1) executes the image deformation process on the deformation area TA of the target image TI. The deformation process is executed by the divided area deformation unit 260 in such a manner that the positions of the dividing points D within the deformation area TA are moved in step S610 to thereby deform the small areas.

The moving mode (moving direction and moving distance) of the position of each dividing point D for deformation process is determined in advance in association with the combinations of the deformation type and the degree of deformation, which are set in step S120 (FIG. 4), by the dividing point moving table 420 (FIG. 1). The divided area deformation unit 260 references the dividing point moving table 420 and moves the positions of the dividing points D using the moving direction and moving distance that are in association with the combination of the deformation type and the degree of deformation, which are set in step S120.

When the deformation "type A" (see FIG. 5) for sharpening a face is set as the deformation type, and the degree of extent "Middle" is set as the deformation degree, the positions of the dividing points D are moved using the moving direction and the moving distance, which are associated with the combination of these deformation type and deformation degree.

In addition, when "Automatic" is selected as the deformation degree, the moving direction and the moving distance of the dividing points D are determined on the basis of the deformation quantity DQ that is set by the deformation quantity setting unit 290.

Figure 32:
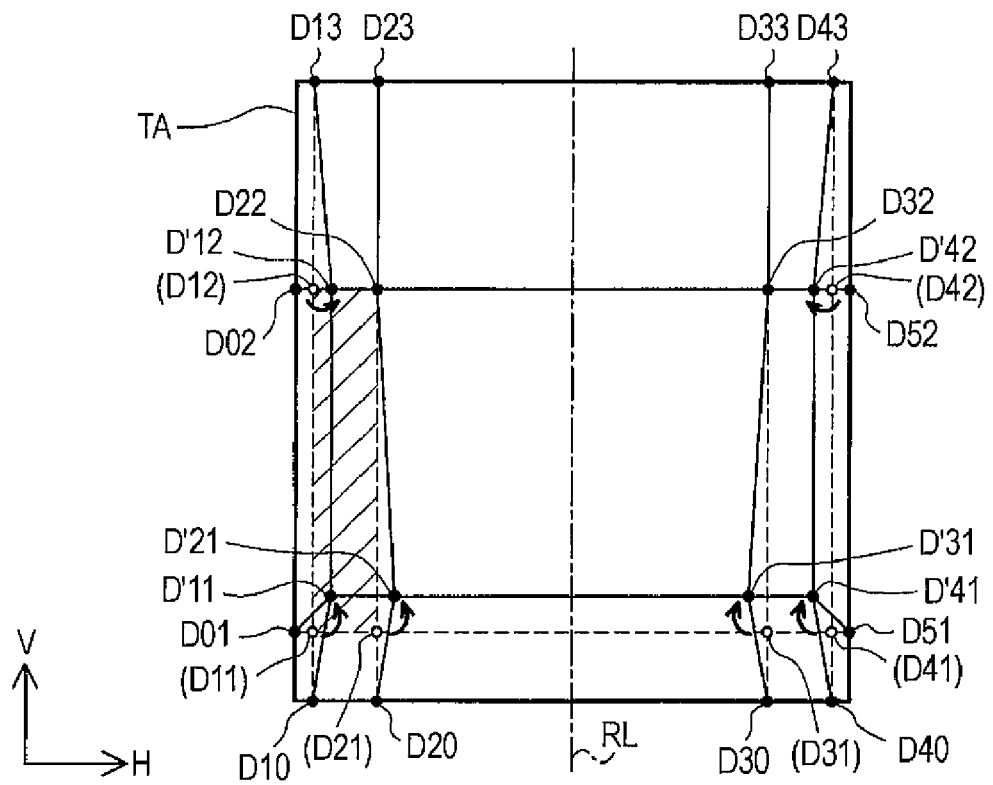
FIG. 32 is a view that illustrates one example in which positions of dividing points are moved in accordance with the dividing point moving table.

FIG. 31 illustrates one example of the content of the dividing point moving table 420. In addition, FIG. 32 illustrates one example of movement of positions of dividing points D in accordance with the dividing point moving table 420. FIG. 31 shows, among the moving modes of the positions of the dividing points D defined by the dividing point moving table 420, a moving mode that is associated with the combination of the deformation type for sharpening a face and the deformation degree "Automatic". As shown in FIG. 31, the dividing point moving table 420 indicates, with respect to each of the dividing points D, the amount of movement along a direction (H direction) perpendicular to the reference line RL and along a direction (V direction) parallel to the reference line RL. The unit of the amount of movement shown in the dividing point moving table 420 is a pixel pitch PP of the target image TI. In addition, the deformation quantity DQp in the table is determined by the deformation quantity setting unit 290 (FIG. 1). In step S590 of FIG. 4, the deformation quantity setting unit 290 calculates the deformation quantity DQp by converting the set deformation quantity DQ to a pixel pitch. In addition, in regard to the H direction, the amount of movement toward the right side is indicated by a positive value and the amount of movement toward the left side is indicated by a negative value, while, in regard to the V direction, the amount of upward movement is indicated by a positive value and the amount of downward movement is indicated by a negative value. For example, the dividing points D11 are moved toward the right side by a distance of DQp times the pixel pitch PP along the H direction and are moved upward by a distance of 2*DQp times the pixel pitch PP along the V direction. In addition, for example, the amount of movement of the dividing point D22 is zero in both the H direction and V direction, so that the dividing point D22 will not be moved. When any one of "Strong (S)", "Middle (M)" and "Weak (W)" is selected as the deformation degree, the deformation quantity DQp employs a value that is determined in advance in association with each of the deformation degrees in place of a value that is adjusted by the deformation quantity setting unit 290.

In the present example embodiment, in order to avoid making the boundary between the images inside and outside the deformation area TA be unnatural, the positions of the dividing points D (for example, the dividing point D10, and the like, shown in FIG. 30) located on the outer frame line of the deformation area TA are not moved. Thus, the dividing point moving table 420 shown in FIG. 31 does not define a moving mode with respect to the dividing points D that are located on the outer frame line of the deformation area TA.

FIG. 32 shows the dividing points D that have not yet been moved using the outline circle and shows the dividing points D that have been moved or the dividing points D of which the positions will not be moved using the solid circle. In addition, the dividing points D that have been moved are denoted by dividing points D'. For example, the position of the dividing point D11 is moved in an upper right direction in FIG. 32 and then it will be a dividing point D'11.

In the present example embodiment, the moving mode is determined so that all the pairs of the dividing points D that are symmetrically located with respect to the reference line RL (for example, the pair of the dividing point D11 and the dividing point D41) maintain the symmetrical positional relationship with respect to the reference line RL even after the dividing points D have been moved.

The divided area deformation unit 260 executes image deformation process on each of the small areas that constitute the deformation area TA so that the images of the small areas in a state where the positions of the dividing points D have not yet been moved become images of small areas that are newly defined through the position movement of the dividing points D. For example, in FIG. 32, the image of a small area (small area indicated by hatching) having vertexes of dividing points D11, D21, D22, and D12 is deformed into the image of a small area having vertexes of dividing points D'11, D'21, D22, and D'12.

Figure 33:
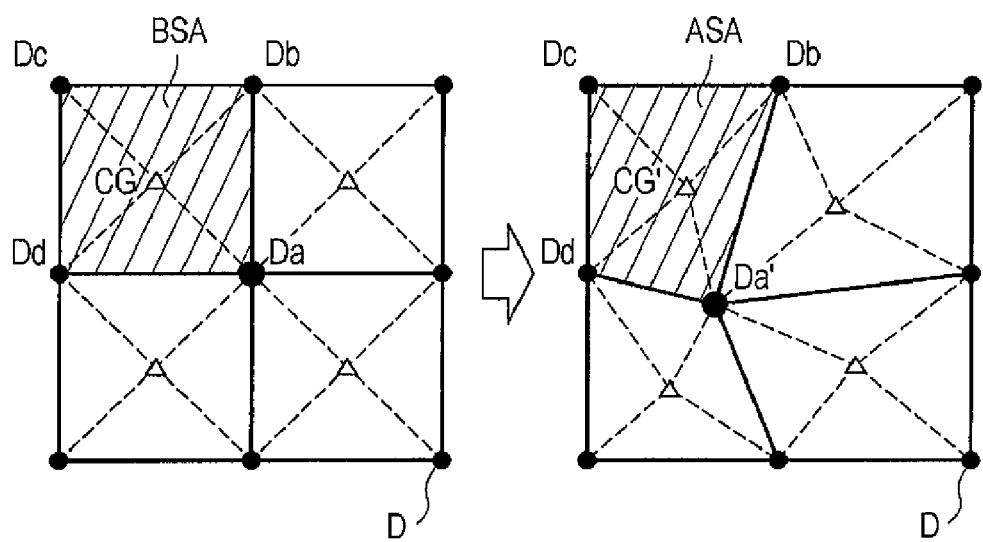
FIG. 33 is a view that illustrates the concept of a method of performing deformation on an image using a divided area deformation unit.

FIG. 33 illustrates the concept of a deformation processing method of an image using the divided area deformation unit 260. In FIG. 33, the dividing points D are shown using solid circles. FIG. 33 shows, with respect to four small areas, the state of dividing points D, of which the positions have not yet been moved, on the left side and the state of dividing points D, of which the positions have been moved, on the right side, respectively, for easy description. In the example shown in FIG. 33, a center dividing point Da is moved to the position of a dividing point Da', and the positions of the other dividing points will not be moved. In this manner, for example, the image of a rectangular small area (hereinafter, also referred to as "pre-deformation focusing small area BSA") having the vertexes of dividing points Da, Db, Dc, and Dd of which the positions of the dividing points D have not yet been moved is deformed into the image of a rectangular small area (hereinafter, also referred to as "post-deformation focusing small area ASA") having the vertexes of the dividing points Da', Db, Dc, and Dd.

In the present example embodiment, the rectangular small area is divided into four triangle areas using the center of gravity CG of the rectangular small area, and the image deformation process is executed on a triangle area basis. In the example of FIG. 33, the pre-deformation focusing small area BSA is divided into four triangle areas, each having one of the vertexes at the center of gravity CG of the pre-deformation focusing small area BSA. Similarly, the post-deformation focusing small area ASA is divided into four triangle areas, each having one of the vertexes at the center of gravity CG' of the post-deformation focusing small area ASA. Then, the image deformation process is executed for each of the triangle areas corresponding to the respective states of the dividing point Da before and after movement. For example, the image of a triangle area that has the vertexes of dividing points Da, Dd and the center of gravity CG within the pre-deformation focusing small area BSA is deformed into the image of a triangle area that has the vertexes of dividing points Da', Dd and the center of gravity CG' within the post-deformation focusing small area ASA.

Figure 34:
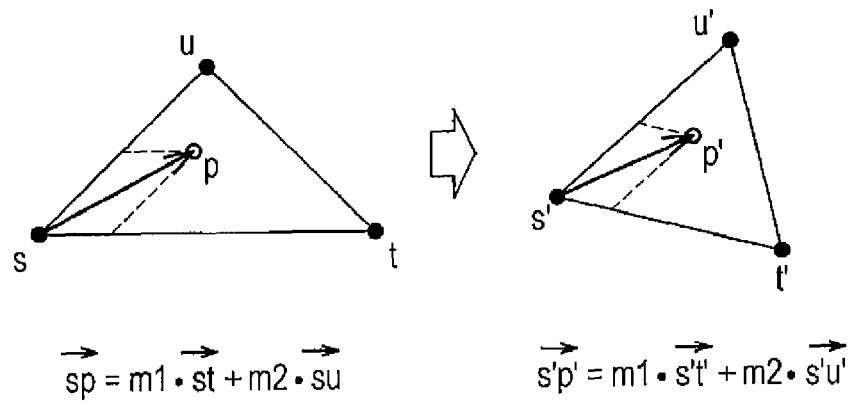
FIG. 34 is a view that illustrates the concept of a method of performing deformation process on an image in a triangle area.

FIG. 34 illustrates the concept of a method of performing deformation process on an image in a triangle area. In the example of FIG. 34, the image of a triangle area stu that has the vertexes of points s, t, and u is deformed into the image of a triangle area s't'u' that has the vertexes of points s', t', and u'. The deformation of an image is performed in such a manner that which one of the positions in the image of the triangle area stu that has not yet been deformed corresponds to each of the positions of pixels in the image of the triangle area s't'u' that has been deformed is calculated, and pixel values in the image that has not yet been deformed at the positions calculated are set to pixel values of the image that has been deformed.

For example, in FIG. 34, the position of a focusing pixel p' in the image of the triangle area s't'u' that has been deformed corresponds to a position p in the image of the triangle area stu that has not yet been deformed. The calculation of the position p is performed in the following manner. First, coefficients m1 and m2 that are used to represent the position of the focusing pixel p' using the sum of a vector s't' and a vector s'u' shown in the following Equation (6) are calculated.

Equation 6

$$\vec{s'p'} = m1 \cdot \vec{s't'} + m2 \cdot \vec{s'u'} \quad (6)$$

Next, using the calculated coefficients m1 and m2, the sum of a vector st and a vector su in the triangle area stu that has not yet been deformed is calculated through the following Equation (7) and, as a result, the position p is obtained.

Equation 7

$$\vec{sp} = m1 \cdot \vec{st} + m2 \cdot \vec{su} \quad (7)$$

When the position p in the triangle area stu that has not yet been deformed coincides with a pixel center position of the image that has not yet been deformed, the pixel value of that pixel is set as a pixel value of the image that has been deformed. On the other hand, when the position p in the triangle area stu that has not yet been deformed becomes a position deviated from the pixel center position of the image that has not yet been deformed, a pixel value at the position p is calculated by means of interpolation computing, such as bicubic, that uses the pixel values of pixels around the position p, and then the calculated pixel value is set to a pixel value of the image that has been deformed.

By calculating the pixel value as described above in regard to each pixel of the image in the triangle area s't'u' that has been deformed, it is possible to execute image deformation process by which the image of the triangle area stu is deformed into the image of the triangle area s't'u'. The divided area deformation unit 260, in terms of each of the small areas that constitute the deformation area TA shown in FIG. 32, defines the triangle area as described above and executes the deformation process, thus the executing image deformation process on the deformation area TA.

Figure 35:
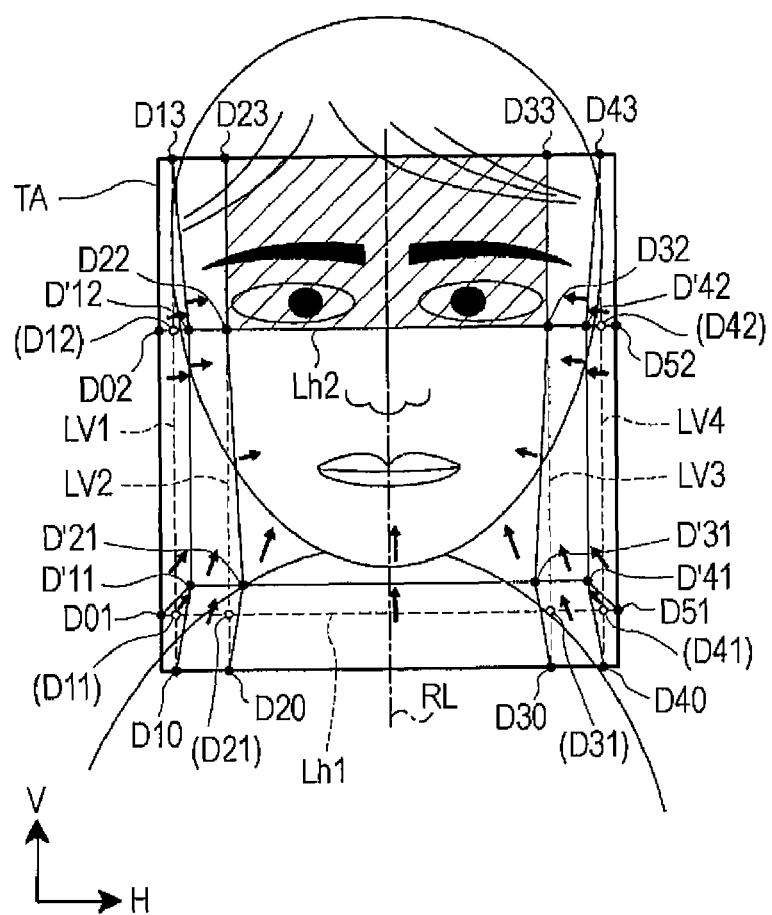
FIG. 35 is a view that illustrates a mode of face shape correction.

The mode of face shape correction, when the deformation "type A" (see FIG. 5) for sharpening a face is set as the deformation type and the "Automatic" is set as the deformation degree, is now described in more detail. FIG. 35 illustrates one example of the mode of face shape correction in the above case. In FIG. 35, the image of deformation mode of each of the small areas that constitute the deformation area TA is shown by the arrow.

In the face shape correction shown in the example of FIG. 35, with respect to a direction (V direction) parallel to the reference line RL, the positions of the dividing points D (D11, D21, D31, D41) that are arranged on the horizontal dividing line Lh1 are moved upward, while, on the other hand, the positions of the dividing points D (D12,D22,D32,D42) that are arranged on the horizontal dividing line Lh2 are not moved (see FIG. 31). Thus, the image located between the horizontal dividing line Lh1 and the horizontal dividing line Lh2 is reduced with respect to the V direction. As described above, because the horizontal dividing line Lh1 is arranged on the lower side relative to the image of the jaw, and the horizontal dividing line Lh2 is arranged immediately below the images of the eyes, in the face shape correction, within the image of the face, the image of an area extending from the jaw to a portion below the eyes is reduced in the V direction. As a result, the line of the jaw in the image is moved upward.

On the other hand, with respect to a direction (H direction) perpendicular to the reference line RL, the positions of the dividing points D (D11, D12) that are arranged on the vertical dividing line Lv1 are moved to the right direction, and the positions of the dividing points D (D41, D42) that are arranged on the vertical dividing line Lv4 are moved to the left direction (see FIG. 31). Furthermore, among two dividing points D that are arranged on the vertical dividing line Lv2, the position of the dividing point D (D21) that is arranged on the horizontal dividing line Lh1 is moved to the right direction, and, among two dividing points D that are arranged on the vertical dividing line Lv3, the position of the dividing point D (D31) that is arranged on the horizontal dividing line Lh1 is moved to the left direction (see FIG. 31). Thus, the image that is located on the left side with respect to the vertical dividing line Lv1 is enlarged to the right side in the H direction, and the image on the right side with respect to the vertical dividing line Lv4 is enlarged to the left side in the H direction. In addition, the image that is located between the vertical dividing line Lv1 and the vertical dividing line Lv2 is reduced or moved to the right side in the H direction, and the image that is located between the vertical dividing line Lv3 and the vertical dividing line Lv4 is reduced or moved to the left side in the H direction. Furthermore, the image that is located between the vertical dividing line Lv2 and the vertical dividing line Lv3 is reduced in the H direction using the position of the horizontal dividing line Lh1 as a center.

As described above, the vertical dividing lines Lv1 and Lv4 each are located outside the image of the line of the cheek, the vertical dividing lines Lv2 and Lv3 each are arranged outside the image of the outer corner of the eye. Therefore, in the face shape correction of the example of FIG. 35, within the image of the face, the images of portions outside both the outer corners of the eyes are entirely reduced in the H direction. In particular, the reduction ratio is high around the jaw. As a result, the shape of the face in the image is entirely narrowed in the width direction.

When the deformation modes in the H direction and in the V direction, described above, are combined, the shape of the face in the target image TI is sharpened through the face shape correction shown in the example of FIG. 35. The sharpening of the shape of a face may be expressed as becoming a so-called "small face".

The small areas (hatched areas) having the vertexes at the dividing points D22, D32, D33, and D23 shown in FIG. 35 include the images of both eyes when the above described method of arranging the horizontal dividing line Lh2 and the vertical dividing lines Lv2 and Lv3 is used. As shown in FIG. 31, because the dividing points D22 and D32 are not moved in the H direction or in the V direction, the small area that includes the images of both eyes is not deformed. In the example of FIG. 35 as described above, the small area that includes the images of both eyes is not deformed, so that the image on which face shape correction has been executed becomes more natural and desirable.

A-5. Other Deformation Process

Figure 36A:
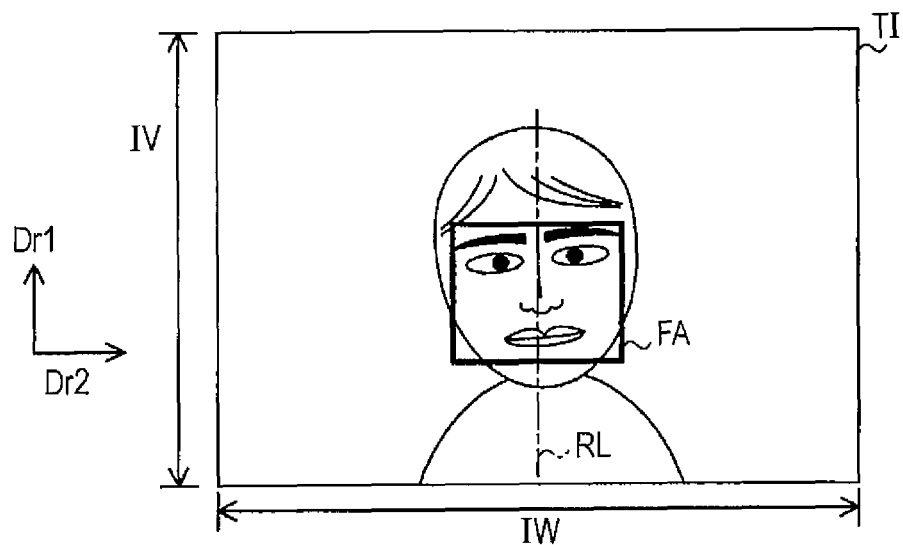
FIG. 36A and FIG. 36B are schematic views, each of which shows another example embodiment of a deformation process.
Figure 36B:
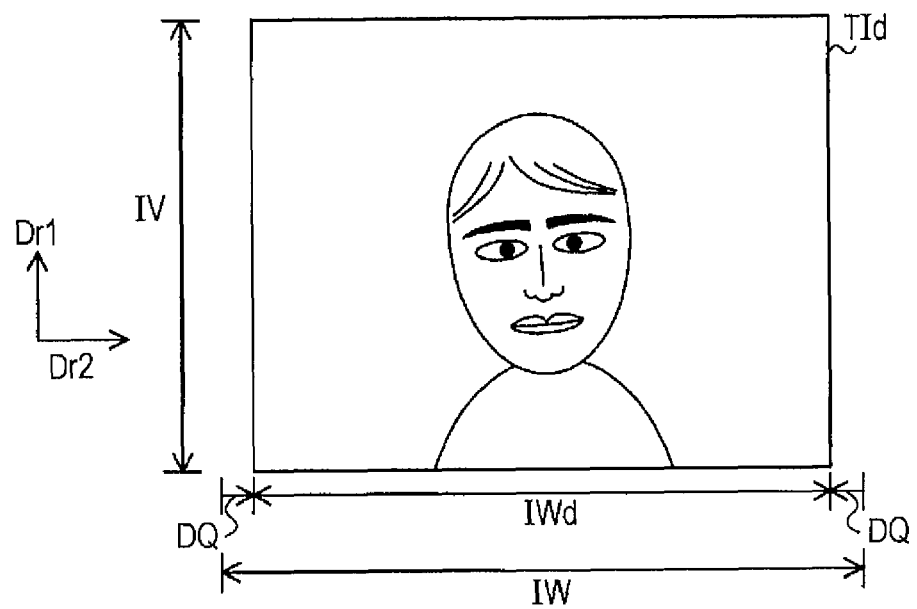

FIG. 36A and FIG. 36B show other example embodiments of a deformation process. As is different from the deformation process shown in FIG. 10A and FIG. 10B, in the example of FIG. 36A and FIG. 36B, the entire aspect ratio of the target image TI is changed in place of portion of the deformation area on the target image TI being deformed.

FIG. 36A shows the target image TI before deformation, and FIG. 36B shows an image TId after deformation. In addition, two directions Dr1 and Dr2 that are perpendicular to each other are shown in the drawing. The first direction Dr1 indicates a direction parallel to the short side of the rectangular image TI or TId, and the second direction Dr2 indicates a direction parallel to the long side of the rectangular image TI or TId. In each of the examples of FIG. 36A and FIG. 36B, the width direction of the face substantially coincides with the second direction Dr2.

In FIG. 36A and FIG. 36B, deformation along the first direction Dr1 is not executed, and deformation (compression) in the second direction Dr2 is executed. Through this deformation, the entire image is compressed in the second direction Dr2. That is, the width of the subject on the target image TI is also narrowed. As a result, it is possible to approximate the impression of the subject obtained by observing an image to the impression obtained by observing the actual subject.

In this deformation, the size (width IWd) of the deformed image TId in the second direction Dr2 is smaller by twice the deformation quantity DQ than the size (width IW) of the image before deformation. That is, the number of pixels of the deformed image TId in the second direction Dr2 is smaller than the number of pixels of that image before deformation. The method of determining pixel values (gray scale values of the pixels) of the deformed image TId may employ various methods. For example, by interpolating pixel values of the target image TI, the pixel values of the deformed image TId may be determined.

The deformation quantity DQ may employ a selected deformation quantity that is described in the above described embodiments. For example, the deformation quantity DQ that is determined on the basis of the subject distance Sd may be employed.

It is desirable to select a direction to be compressed from among two directions Dr1 and Dr2 on the basis of the detection result of the orientation of the subject. For example, the face area detection unit 220 (FIG. 1), as shown in FIG. 15 and FIG. 36A, is able to detect the reference line RL that indicates the height direction (vertical direction) of the face area FA. Then, it is desirable to select, between the two directions Dr1 and Dr2, a direction in which an angle made with this reference line RL is larger (in each of the examples of FIG. 36A and FIG. 36B, second direction Dr2). In this manner, it is possible to reduce the width (the size in the horizontal direction) of the subject.

When the deformation process that changes the entire aspect ratio of the target image TI is employed, the face shape correction unit 200 shown in FIG. 1 may be employed as the face shape correction unit. However, it is possible to omit the deformation area dividing unit 250 and the divided area deformation unit 260 from the deformation processing unit. Instead, it is only necessary for the deformation processing unit to have the function of changing the aspect ratio of the target image TI. In addition, the face area adjustment unit 230 and the deformation area setting unit 240 may be omitted. The face area detection unit 220 may be used to detect the orientation of a subject. However, the face area detection unit 220 may be omitted.

In place of the deformation process in which the target image TI is compressed along the width direction of a subject, the deformation process in which the target image TI is extended along the height direction of a subject may be employed. In this case as well, because a ratio of the width to the height of the subject is reduced, it is possible to approximate the impression of the subject obtained by observing the image to the impression obtained by observing the actual subject. B. Alternative Example Embodiments The aspects of the invention are not limited to the example embodiments or embodiment described above, but they may be modified into various alternative embodiments without departing from the scope of the appended claims. The following alternative example embodiments are, for example, applicable.

B1. First Alternative Example Embodiment

In the above example embodiment, the head size setting process (step S124 in FIG. 4) is executed in accordance with user's instruction through the user interface (FIG. 6) for setting the size of the head; however, it is not always necessary to execute the head size setting process in accordance with user's instruction. For example, without using the user interface shown in FIG. 6, a standard value of the head size defined in the head size information 430 may always be set as a value of the head size used for processing.

In addition, a user interface that is different from the one shown in FIG. 6 may be used as a user interface for setting the size of the head. For example, in place of the entry fields for the size Wh in the width direction and the size Dh in the depth direction, a user interface that includes an entry field into which another piece of information regarding the size of the head is entered may be used. For such another piece of information, for example, a flattening of the ellipse when the horizontal cross section of the head is elliptical may be employed. In this case, values of the head size corresponding to flattenings may be defined in the head size information 430, and a value of the head size corresponding to the flattening entered by a user may be set as a value used for processing.

For the another piece of information, the age (or age bracket) of a subject and/or the race of the subject may be employed, for example. In this case as well, values of the head size corresponding to the age (or age bracket) of a subject or the race of the subject (or a combination of them) may be defined in the head size information 430, and a value of the head size corresponding to the age (or age bracket) of a subject and/or the race of the subject, which are entered by a user, may be set as a value used for processing. At this time, it is not always necessary that the age (or age bracket) and/or the race of a subject is entered by a user; for example, the age (or age bracket) and/or the race of a subject may be estimated through image analysis of a target image TI, and then a standard value of the head size corresponding to the estimated age (or age bracket) and/or the race may be set as a value used for processing.

B2. Second Alternative Example Embodiment

In the above example embodiment, the distance d (FIG. 11) used for setting the deformation quantity DQ employs the subject distance Sd that is estimated (set) in step S570 in FIG. 4; however, it is not always necessary to use the subject distance Sd as the distance d. A value that is specified by a user or a value (fixed value) that is set in advance may be employed as the distance d. In this case, it is not necessary to set (estimate) the subject distance Sd in step S570.

B3. Third Alternative Example Embodiment

In the above example embodiment, the head of a person is employed as the specific subject, and the image deformation process by which the shape of a face included in the head of a person is corrected is executed. However, the specific subject is not limited to the head of a person, and another subject may be employed as the specific subject. The specific subject is desirably a subject that has a substantially elliptical (including circular) horizontal cross section, and, for example, may employ a ball or a substantially cylindrical building as the specific subject. In addition, the method of detecting a subject from the target image may employ a selected method.

B4. Fourth Alternative Example Embodiment

Figure 37:
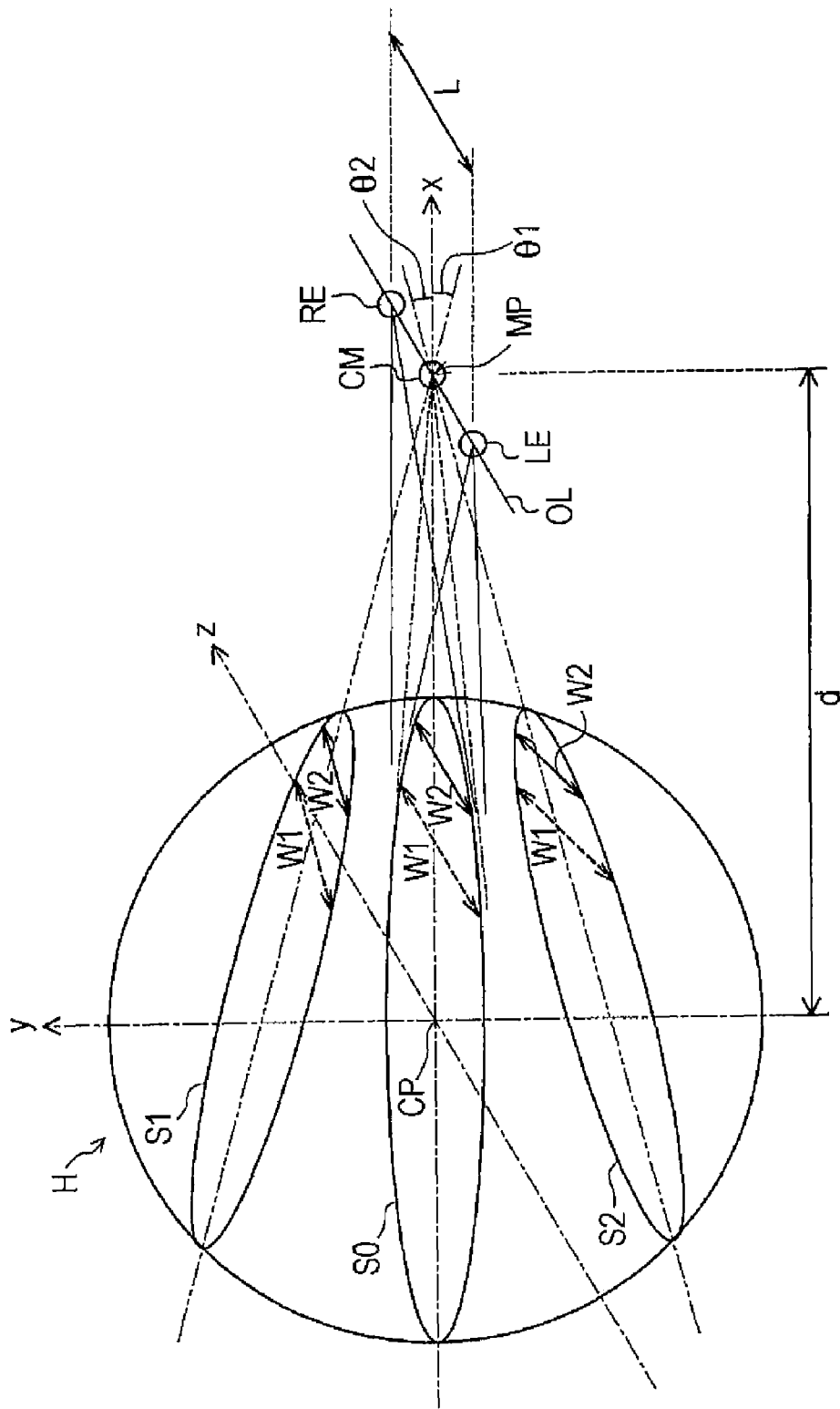
FIG. 37 is a view that illustrates a difference in impression between the image of a face and an actual face according to an alternative example embodiment.

In the above example embodiment, the deformation quantity DQ is set in consideration of a difference between a range viewable by the camera CM (the first width W1 in FIG. 11) and a range viewable by eyes (second width W2 in FIG. 11) on a cross section of the head of a person (head ellipse HE in FIG. 11), which serves as the specific subject. Instead, the deformation quantity DQ may be set similarly in consideration of a plurality of cross sections of the head of a person. FIG. 37 illustrates a difference in impression between the image of a face and the actual face according to an alternative example embodiment. In FIG. 37, the head H of a person is modeled as an ellipsoid or a sphere. In FIG. 37, a cross section S0 of the head H in a plane that includes a straight line OL that connects the right eye RE and the left eye LE and the center point CP of the head H corresponds to the head ellipse HE shown in FIG. 11. On the cross section S0, as in the case of the example embodiment shown in FIG. 11, the first width W1 and the second width W2 are calculated.

In the alternative example embodiment of FIG. 37, cross sections S1 and S2 of the head H included in planes that include the straight line OL and make angles θ1 and θ2 with the cross section S0, respectively are considered. That is, in both the cross section S1 and the cross section S2 as well, the first width W1 and the second width W2 are calculated similarly. Note that distances between the centers of the cross sections S1 and S2 and the middle point MP and diameters of the cross sections S1 and S2, which are used for calculating the first width W1 and the second width W2, may be geometrically calculated on the basis of the angles θ1 and θ2. At the positions (heights) of the cross sections S1 and S2 on the face-side surface of the head H, the first width W1 and the second width W2 that are calculated for the cross sections S1 and S2 are used to calculate the deformation quantity DQ. That is, the deformation quantity DQ may vary in the height direction of the face. In FIG. 37, because the deformation quantity DQ may be set not only in consideration of the horizontal cross-sectional shape of the head H but also in consideration of the vertical cross-sectional shape thereof, the image deformation process may be performed so that the impression obtained by observing the image of a face is further approximated to the impression obtained by observing the actual face.

B5. Fifth Alternative Example Embodiment

In the above example embodiment, the case in which only one face area FA is detected from the target image TI will be described; however, when a plurality of face areas FA are detected from the target image TI, image processing, such as face shape correction process, may be executed on each of the face areas FA.

In addition, a method of detecting the face area FA (step S130 in FIG. 4), setting the deformation area TA (step S500 in FIG. 4) or deformation process (step S600 in FIG. 4) in the above example embodiment is an example, and these processes may be executed through another method.

B6. Sixth Alternative Example Embodiment

In the above example embodiment, as shown in FIG. 9, the subject distance Sd is estimated using a horizontal length (the overall width Wwi of the target image TI, the width Wfi of the face area FA, the width Wf of the face of a person P, or the width Wx of the imaging plane IS); however, the subject distance Sd may be estimated using a vertical length, that is, the height of the target image TI, the height of the face area FA, the height of the face of a person P, or the height of the imaging plane IS.

In addition, in the above example embodiment, the overall width Wwi of the target image TI and the width Wfi of the face area FA are used as data by which the size of the image of a subject relative to the size of the target image TI is determined; however, the area of the face area FA (or the number of pixels) relative to the overall area (or the number of pixels) of the target image TI may be used instead.

B7. Seventh Alternative Example Embodiment

In the above example embodiment, the deformation area is set as a rectangular area; however the shape of the deformation area may be another shape (for example, an elliptical shape or a rhombic shape).

B8. Eighth Alternative Example Embodiment

In the above example embodiment, the face shape correction printing process (FIG. 3) by the printer 100, which serves as an image processing device, is described; however, the face shape correction printing process may be performed in such a manner that, for example, the face shape correction and the display of a corrected image (step S100 and step S200) are executed by a personal computer and only the printing process (step S300) is executed by the printer. In addition, the printer 100 is not limited to an ink jet printer, but it may include printers of other types, such as a laser printer or a dye sublimation printer, for example.

In addition, the deformed image data may be not only used for printing but also used for a selected application. For example, a display device (for example, a projector) may be employed to use the image data for displaying.

B9. Ninth Alternative Example Embodiment

In the above example embodiment, the deformation process may employ various processes. For example, the image in the deformation area TA may not be deformed in the height direction of the subject but may only be deformed in the horizontal direction of the subject.

In any case as well, it is desirable to employ the deformation process in which the size of at least a portion of the subject on the target image TI in one direction (hereinafter, referred to as "reducing direction") is reduced. In this manner, when the image and the actual subject are observed at an angle at which the reducing direction is oriented in a lateral direction as viewed from an observer, it is possible to approximate the impression of the subject obtained by observing the image to the impression obtained by observing the actual subject. Here, it is desirable to reduce the size shown by the contour of the subject in the reducing direction. That is, it is desirable that the length, in the reducing direction, of an area surrounded by the contour becomes small. In this manner, at least the contour of the subject is desirably deformed by the deformation process. In this manner, it is possible to appropriately approximate the impression of the subject obtained by observing the image to the impression obtained by observing the actual subject.

The reducing direction may be set in a selected direction on the target image TI. For example, a predetermined direction (for example, a direction parallel to the long side of the target image TI) may be employed as the reducing direction. However, it is desirable that an angle made by the reducing direction with the width direction of the subject is 30 degrees or below, it is particularly desirable that this angle is 15 degrees or below, and it is most desirable that the reducing direction is oriented in the width direction of the subject. In this manner, in most cases, it is possible to execute natural and desirable deformation.

The method of determining the reducing direction so as to be approximated to the width direction of a subject may employ various methods. For example, the deformation processing unit may use information related to the width direction of a subject to thereby determine the reducing direction. The information related to the width direction of a subject may employ various pieces of information. For example, the detected orientation of a subject may be employed. In the above described example embodiment, the face area detection unit 220 detects the orientation of a subject (in this case, a face) by analyzing the target image TI. In addition, some image pickup apparatuses store vertical information, which indicates a vertical direction (gravitational direction) with respect to the ground at the time of imaging, in an image file as history information. When such the vertical information is available, it is possible to specify the gravitational direction on the target image TI on the basis of the vertical information. Thus, it is possible to employ a direction, perpendicular to that gravitational direction, as the width direction of a subject.

In addition, the deformation processing unit may determine the reducing direction in accordance with instructions by a user. For example, the deformation processing unit may receive instructions that indicate the width direction of a subject and then determine the reducing direction in accordance with the received instructions.

In addition, there is a case that the width direction of a subject may be determined in advance to coincide with a predetermined direction on the target image TI. For example, in most target images TI that are imaged by a general user, the width direction of a subject is parallel to the long side of the target image TI. In such a case, the deformation processing unit may employ a predetermined direction (in this case, a direction parallel to the long side) on the target image TI as the width direction of a subject. That is, a predetermined direction on the target image TI may be employed as the reducing direction.

The above description may also apply to the case in which the subject is not the face of a person. In addition, a portion of the subject to be deformed may be selectively set.

B10. Tenth Alternative Example Embodiment

In the above example embodiment, a portion of the configuration implemented by hardware may be replaced by software, or, conversely, a portion of the configuration implemented by software may be replaced by hardware. For example, all the functions of the deformation area dividing unit 250 and the divided area deformation unit 260 shown in FIG. 1 may be implemented by a hardware circuit that includes a logic circuit.

On the other hand, when a portion or all of the functions of the aspects of the invention are implemented by software, the software (computer program) may be provided so that it is stored in a computer readable recording medium. In the aspects of the invention, the "computer readable recording medium" is not only a portable recording medium, such as a flexible disk or a CD-ROM, but also an internal storage device of the computer, such as various RAM and ROM, and an external storage device, such as a hard disk, fixed to the computer.

B11. Eleventh Alternative Example Embodiment

Manner to Perform Deformation Process

To perform the deformation process, the image processing device that performs deformation of an image may include a deformation area setting unit that sets at least a portion of an area on a target image as a deformation area, a deformation area dividing unit that arranges a plurality of dividing points in the deformation area and divides the deformation area into a plurality of small areas by using a straight line that connects the dividing points to one another, and a deformation processing unit that moves at least one of positions of the dividing points to deform the small areas to thereby perform deformation of an image in the deformation area.

In this image processing device, a plurality of dividing points are arranged in a deformation area that is set on the target image, and the deformation area is divided into a plurality of small areas using a straight line that connects the dividing points to one another. In addition, the deformation process of an image in the deformation area is executed in such a manner that the positions of the dividing points are moved and thereby the small areas are deformed. In this manner, it is possible to perform image deformation only by arranging dividing points in the deformation area and then moving the arranged dividing points. Thus, image processing of image deformation corresponding to various deformation modes is easily and effectively achieved.

The above image processing device may further include a deformation mode setting unit that selects one of a plurality of predetermined deformation types and applies it to deformation of an image in the deformation area, wherein the deformation area dividing unit arranges the plurality of dividing points in accordance with a predetermined arrangement pattern that is associated with the set deformation type.

According to the above configuration, because the arrangement of dividing points, that is, dividing of the deformation area, appropriate to each of the deformation types, such as a deformation type to sharpen a face or a deformation type to enlarge eyes, for example, is performed, it is possible to further easily perform image processing for image deformation corresponding to each deformation type.

In addition, in the above image processing device, the deformation mode setting unit may select one of a plurality of predetermined deformation degrees and sets it as a deformation degree applied to deformation of an image in the deformation area, and the deformation processing unit may move positions of the dividing points in accordance with a predetermined moving direction and amount of movement that are associated with a combination of the set deformation type and deformation degree.

According to the above configuration, when the deformation type and the deformation degree are set, image deformation in accordance with the combination of them is executed. Thus, it is possible to further easily perform image processing for image deformation.

In addition, in the above image processing device, the deformation mode setting unit may include a specification acquiring unit that acquires user specification related to the moving direction and amount of movement of at least one of the dividing points, and the deformation processing unit may move a position of the at least one of the dividing points in accordance with the acquired user specification.

According to the above configuration, it is possible to easily achieve image processing for image deformation in a mode that is further close to a user's request.

In addition, in the above image processing device, the deformation area setting unit may set the deformation area so as to include at least a portion of an image of a face in the deformation area.

According to the above configuration, for the image of a face, it is possible to easily and effectively achieve image processing for image deformation corresponding to various deformation modes.

In addition, in the image processing device, the deformation area dividing unit may arrange the plurality of dividing points so that at least one pair of the dividing points are arranged at positions that are symmetrical with respect to a predetermined reference line, and the deformation processing unit may move the at least one pair of the dividing points while the positional relationship that the at least one pair of the dividing points are symmetrical with respect to the predetermined reference line is maintained.

According to the above configuration, the image deformation that is bilaterally symmetrical with respect to a predetermined reference line is performed, so that it is possible to achieve image processing for image deformation of a further natural and desirable face image.

In addition, in the above image processing device, the deformation processing unit may be configured not to perform deformation on at least one of the small areas.

According to the above configuration, a desired image deformation may be performed without largely changing the impression of a face, so that it is possible to achieve image processing for image deformation of a further natural and desirable face image.

In addition, in the above image processing device, the deformation processing unit may be configured not to perform deformation on the small area that includes the image of an eye.

According to the above configuration, by not performing deformation on the small area that includes the image of an eye, it is possible to achieve image processing for image deformation of a further natural and desirable face image.

In addition, the above image processing device may further include a face area detection unit that detects a face area that displays the image of a face on the target image, and the deformation area setting unit may set the deformation area on the basis of the detected face area.

According to the above configuration, with respect to image deformation of the deformation area that is set on the basis of the face area detected from the target image, it is possible to easily and effectively achieve image deformation corresponding to various deformation modes.

In addition, the image processing device may further include a printing unit that prints out the target image on which deformation of an image in the deformation area has been performed.

According to the above configuration, it is possible to easily and effectively achieve printing of an image on which image deformation has been performed in correspondence with various deformation modes.

What is claimed is:

1. An image processing device comprising:
   a size setting unit that sets a size of a specific subject in a width direction and in a depth direction in a target image generated through imaging; and
   a deformation processing unit that deforms an image within an area, which includes an image of the specific subject in the target image, to a deformation degree corresponding to the set size.

2. The image processing device according to claim 1, wherein the deformation processing unit performs image deformation such that an image is deformed at least in the width direction of the specific subject.

3. The image processing device according to claim 1, wherein when the size of the specific subject in at least one of the width direction and the depth direction is constant, the deformation processing unit performs image deformation such that the deformation degree is increased as the ratio of the size in the depth direction to the size in the width direction increases.

4. The image processing device according to claim 3, further comprising:
   a distance setting unit that sets a subject distance from an image pickup apparatus to the specific subject when the target image is generated, wherein
   the deformation processing unit performs image deformation such that, when the size of the specific subject in the width direction and in the depth direction is constant, the deformation degree is increased as the set subject distance decreases.

5. The image processing device according to claim 1, further comprising:
   a subject detection unit that detects the image of the specific subject in the target image.

6. The image processing device according to claim 1, wherein the specific subject has a substantially elliptical horizontal cross section.

7. The image processing device according to claim 1, wherein the specific subject is a head of a person.

8. An image processing method comprising:
   setting a size of a specific subject in a width direction and in a depth direction in a target image generated through imaging; and
   deforming an image within an area, which includes an image of the specific subject in the target image, to a deformation degree corresponding to the set size.

9. A non-transitory computer readable recording medium containing a computer program for image processing, executable on a computer, the computer program comprising instructions for:
   setting a size of a specific subject in a width direction and in a depth direction in a target image generated through imaging; and
   deforming an image within an area, which includes an image of the specific subject in the target image, to a deformation degree corresponding to the set size.

10. An image processing device comprising:
    a processor; and
    an internal memory storing instructions for causing the processor to:
    set a size of a specific subject in a width direction and in a depth direction in a target image generated through imaging; and
    deform an image within an area, which includes an image of the specific subject in the target image, to a deformation degree corresponding to the set size.

* * * * *